United States Patent
Yamada et al.

(10) Patent No.: US 6,229,543 B1
(45) Date of Patent: May 8, 2001

(54) MICROPROCESSOR, AND GRAPHICS PROCESSING APPARATUS AND METHOD USING THE SAME

(75) Inventors: Hiromichi Yamada; Tadashi Fukushima; Shigeru Matsuo, all of Hitachi; Takashi Miyamoto, Tokyo; Tooru Komagawa; Syoji Yoshida, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 07/511,778

(22) Filed: Apr. 20, 1990

(30) Foreign Application Priority Data

Apr. 20, 1989 (JP) .................................................. 1-101365

(51) Int. Cl.[7] .................................................. G06T 1/00
(52) U.S. Cl. .................................................. 345/418
(58) Field of Search .................................................. 364/518–521, 364/200; 395/161–164; 345/418

(56) References Cited

U.S. PATENT DOCUMENTS

| | | | |
|---|---|---|---|
| 4,250,545 | 2/1981 | Blahut et al. | 395/375 |
| 4,733,305 | * 3/1988 | Miura et al. | 358/280 |
| 4,749,990 | * 6/1988 | Birkner | 340/799 |
| 4,918,626 | * 4/1990 | Watkins et al. | 364/518 X |
| 4,930,087 | * 5/1990 | Egawa et al. | 364/518 |
| 4,947,342 | * 8/1990 | Katsura et al. | 364/518 |
| 5,046,023 | * 9/1991 | Katsura et al. | 395/162 X |

FOREIGN PATENT DOCUMENTS

| | | | |
|---|---|---|---|
| 0196751 | 10/1986 | (EP) | G06F/9/30 |
| 0196751A2 | 11/1986 | (EP) . | |
| 0196751A3 | 11/1986 | (EP) . | |
| 0279229 | 8/1988 | (EP) | G09G/1/16 |
| 0279229A2 | 8/1988 | (EP) . | |
| 57023150 | 5/1982 | (JP) | G06F/9/30 |
| 58-010243 | 1/1983 | (JP) . | |
| 62-123571 | 6/1987 | (JP) . | |
| 63-163391 | 7/1988 | (JP) . | |
| 64-31228 | 2/1989 | (JP) . | |
| 63257052 | 10/1998 | (JP) . | |
| 8700329 | 1/1987 | (WO) | G09G/1/00 |
| WO8700329A | 1/1987 | (WO) . | |

OTHER PUBLICATIONS

*Electronic Design*, "Digital Signal Processing IC Helps to Shed New Light On Image Processing Applications", P. Casey, et al., Mar. 20, 1986, vol. 34, No. 7, USA.

Electronic Design, vol. 34, No. 7, Mar. 20, 1986 pp. 135–140.*

* cited by examiner

*Primary Examiner*—Almis R. Jankus
(74) *Attorney, Agent, or Firm*—Antonelli, Terry, Stout & Kraus, LLP

(57) ABSTRACT

A microprocessor for processing a large quantity of graphics data. The microprocessor independent of a CPU has two ports, and performs an instruction fetch and a data access or a memory access simultaneously to two memories mounted on separate buses. A graphics processing apparatus provided by the microprocessor transfers the graphics data between a system memory and a frame memory at high speeds.

12 Claims, 18 Drawing Sheets

FIG. 3
RO (CONTROL REGISTER)
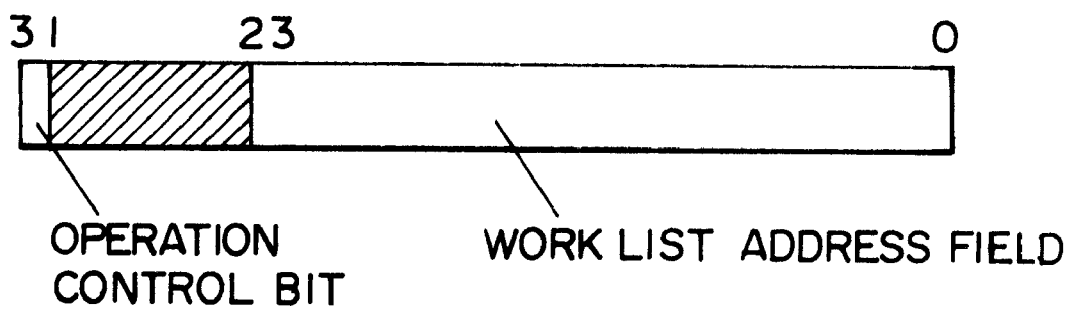
OPERATION CONTROL BIT — WORK LIST ADDRESS FIELD
R1 (PROGRAM COUNTER)
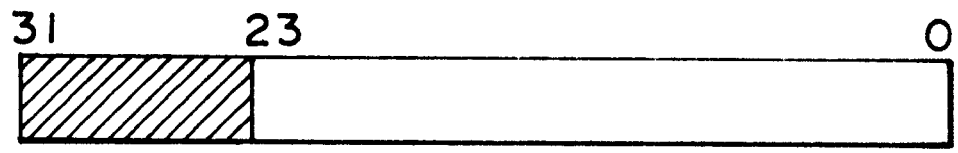

| PORT DESIGNATING METHOD | CONDITION BIT |
|---|---|
| IF DATA OF ADDRESS REGISTER ≧ COMPARISON DATA, DESIGNATE PORT 1 | 0 |
| IF DATA OF ADDRESS REGISTER ≧ COMPARISON DATA, DESIGNATE PORT 2 | 1 |

MICROPROCESSOR, AND GRAPHICS PROCESSING APPARATUS AND METHOD USING THE SAME

BACKGROUND OF THE INVENTION

1. Field of the Invention

This invention relates to a microprocessor suitable for performing graphics processes, and more particularly to graphics processing apparatus and method using the microprocessor and suitable for transferring graphics data between memories on separate buses.

2. Description of the Related Art

A conventional microprocessor system having two sets of buses, each set for address, data and control signals, is exemplified by Harvard Architecture. This conventional system is designed so as to avoid any contention between an instruction fetch and a data access by separating an instruction bus and a data bus.

Also, LSIs for graphics process are exemplified by a bit map control processor (BMCP) discussed in Toshiba Review 43th volume, 12th issue (1988), pages 932–935. This BMCP has an 8-bit data bus, as a system bus to which a CPU and a system momory are connected, and a 64-bit local memory data bus and a 24-bit address bus independently of the data bus; the address bus and local memory data bus access 8-plane local memories (image memories). Further, with an address latched, the BMCP can access the system memory.

In the Harvard Architecture, the instruction bus and the data bus are dedicated; the Harvard Architecture is totally silent about the concept of using two sets of buses in data access, such as in graphics transfer between a system memory and a frame memory which transfer is performed most frequently among various procedures of the graphics processing.

The BMCP may use two sets of buses in data access, but has only a single address bus; it is unclear from Toshiba Review that two memories can be simultaneously accessed.

Further, in executing a so-called read/modify/write instruction frequently used for graphics processing in which data in a memory address is read and processed and is then written back to the same address, conventional general microprocessors have the following problems.

First of all, in CISC (Complex Instruction Set Computer) type general processors, although a single instruction is capable of describing a read/modify/write operation with memory addresses designated for a source operand and a destination operand of the operation instruction, the length of instruction is necessarily long. Also, it is not clear if it is possible to make the execution without interposing a wait cycle between a read cycle and a write cycle.

In some of exclusive processors for graphics process, though a read/modify/write instruction can be executed in two successive memory cycles, its modifying function is limited.

In RISC (Reduced Instruction Set Computer) type processors, instructions are basically of a fixed length, and operands accessible to a memory are allowed to be designated only for a load instruction and a store instruction. Thus, execution of a read/modify/write operation requires three instructions, i.e. load, operation and store instructions, failing to execute the load and store instructions in two successive memory cycles.

SUMMARY OF THE INVENTION

It is therefore an object of this invention to enable a high-speed transfer of graphics data between two memories, as accessed simultaneously to the memories on separate buses, in a graphics processing apparatus for processing a large quantity of graphics data.

Another object of the invention is to enable the execution of a read/modify/write operation very popular in graphics processing, without interposing a null cycle between a read cycle and a write cycle, in a processor of RISC-type.

According to a first aspect of this invention, a graphics processing apparatus includes a CPU and a system memory, each connected to a system bus composed of address, data and control buses; a local memory and a frame memory, each connected to a local bus composed of address, data and control buses; and a graphics processing processor having a first port connected to said system memory, and a second port connected to said local bus, said graphics processing processor being capable of simultaneously accessing to the system memory and the local or frame memory via the first and second ports, respectively.

According to a second aspect of the invention, another graphics processing apparatus includes a CPU and a first memory, each connected to a system bus composed of address, data and control buses; a second memory connected to a local bus composed of address, data and control buses; and a graphics processing processor having a first port connected to the system bus, a second port connected to the local bus, and a plurality of internal registers, wherein the graphics processing processor is capable of loading graphics data to one of the internal registers from one of said first and second memories via the corresponding one of the first and second ports and also, in parallel with the loading, capable of storing data to the other one of the first and second memories from another of the internal registers.

According to a third aspect of the invention, a graphics processing method using a graphics processing apparatus includes the steps of storing a graphics transfer program in the system memory or the local memory, and also storing various graphic data in the system memory; writing a leading address of the graphics transfer program and a leading address of parameters of the graphic data in the system memory or the local memory by the CPU when the graphics data in the system memory are transferred to the frame memory; and causing the graphics processor, according to said graphic transfer program and the parameters, to transfer the graphic data on the system memory to the frame memory via said first and second ports.

According to a fourth aspect of the invention, another graphics processing method using a graphics processing apparatus includes the steps of storing various graphics drawing programs in the system memory or the local memory; when drawing the graphics, preparing a work list, composed of a leading address of the graphics drawing programs and a leading address of parameters of the graphic data, in the system memory or the local memory by the CPU; and causing the graphics processing processor to read the contents of the work list in response to an instruction of the CPU and to draw the graphics in the frame memory according to the graphics drawing programs and parameters designated by the work list.

According to a fifth aspect of the invention, a microprocessor includes a processor unit for decoding and executing an instruction; two ports each for transferring address, data and control signals between each of the ports and a respective memory; an address buffer writable from the processor unit and readable from the two ports; a data buffer which is readable and writable from the two ports and from which an instruction may be read by the processor unit; and means for controlling an address transfer from the address buffer to one of the memories and also a data transfer between the data buffer and one of the memories via the designated port according to a memory access request and a port designating signal from the processor unit; whereby an instruction fetch and a data access can be performed with respect to the two memories.

According to a sixth aspect of the invention another microprocessor includes a processor unit for decoding and executing an instruction; two ports each for transferring address, data and control signals between each of the ports and a respective memory; two sets of an address buffer and a data buffer, each of the sets dedicated for a respective one of the two ports; means for managing the operation of each of said two ports; and means for writing, to a register in said processor unit, data read from the memories; whereby accesses can be taken simultaneously to two memories via said two ports.

According to a seventh aspect of the invention, still another microprocessor for executing instructions each having a fixed length, includes first instruction holding means for holding a primary instruction read from a program; second instruction holding means for holding a sub-instruction accompanying to the primary instruction; and decoding means for decoding the primary instruction and the sub-instruction, whereby when the primary instruction is an instruction using the sub-instruction as a result of the decoding of the primary instruction, the sub-instruction held by said sub-instruction holding means is decoded and executed.

With the arrangement of this invention, the two-port microprocessor performs the reading, decoding and executing of an instruction and the storing of data, preferably with pipeline processing. In the case of memory access instruction, its process is assigned to a unit dedicated for memory access processing, whereupon the two-port microprocessor executes the next instruction. If the process has already assigned to the port, the memory access processing unit causes the instruction executing unit to wait executing the next instruction, until the port becomes available for use, by managing the operation status of the two ports. Therefore, even while one port is in operation, the memory access via the other portion can be accepted.

Partly since two sets of buses of the two-port microprocessor are usable for instruction fetch and data access, and partly since two simultaneous memory accesses are possible, the memory accessing efficiency is improved. In the case of a graphics processing apparatus in particular, it is possible to transfer the graphics data between the system memory and the frame memory at high speed.

Further, with the read and write instructions being located in the program in the memory, and with the operation process instruction being located in a sub-instruction buffer independent of the ordinary instruction buffer, an operation instruction is fetched from the above buffer at a timing at which the read data are ready to use, so that the operation of the read data is in time for the write cycle, enabling a read/modify/write process of the two successive memory cycles.

Parameters for graphics drawing, rectangular field transfer, with a logic operation or the like are not given directly from the CPU to the two-port microprocessor, but are successively written in the memory by the CPU, and at the same time, its leading address is placed in the work list in the memory, so that subsequent graphics processing such as graphics drawing and transfer can all be assigned to the two-port microprocessor. Namely, as the graphics processing is started by the CPU, the two-port microprocessor executes the designated processes in the work list, successively with reference to the processing program and parameters. In the CPU, if a work list is prepared beforehand for a plurality of graphics processes, it is unnecessary to give to the two-port microprocessor parameters for each and every graphics process, thus minimizing the burden on the CPU.

The above and other advantages, features and additional objects of this invention will be manifest to those versed in the art upon making reference to the following detailed description and the accompanying drawings in which several preferred embodiments incorporating the principles of this invention are shown by way of illustrative example.

BRIEF DESCRIPTION OF THE DRAWINGS

FIG. 3 is a diagram showing internal registers of the processor of FIG. 1;

DETAILED DESCRIPTION

Figure 1:
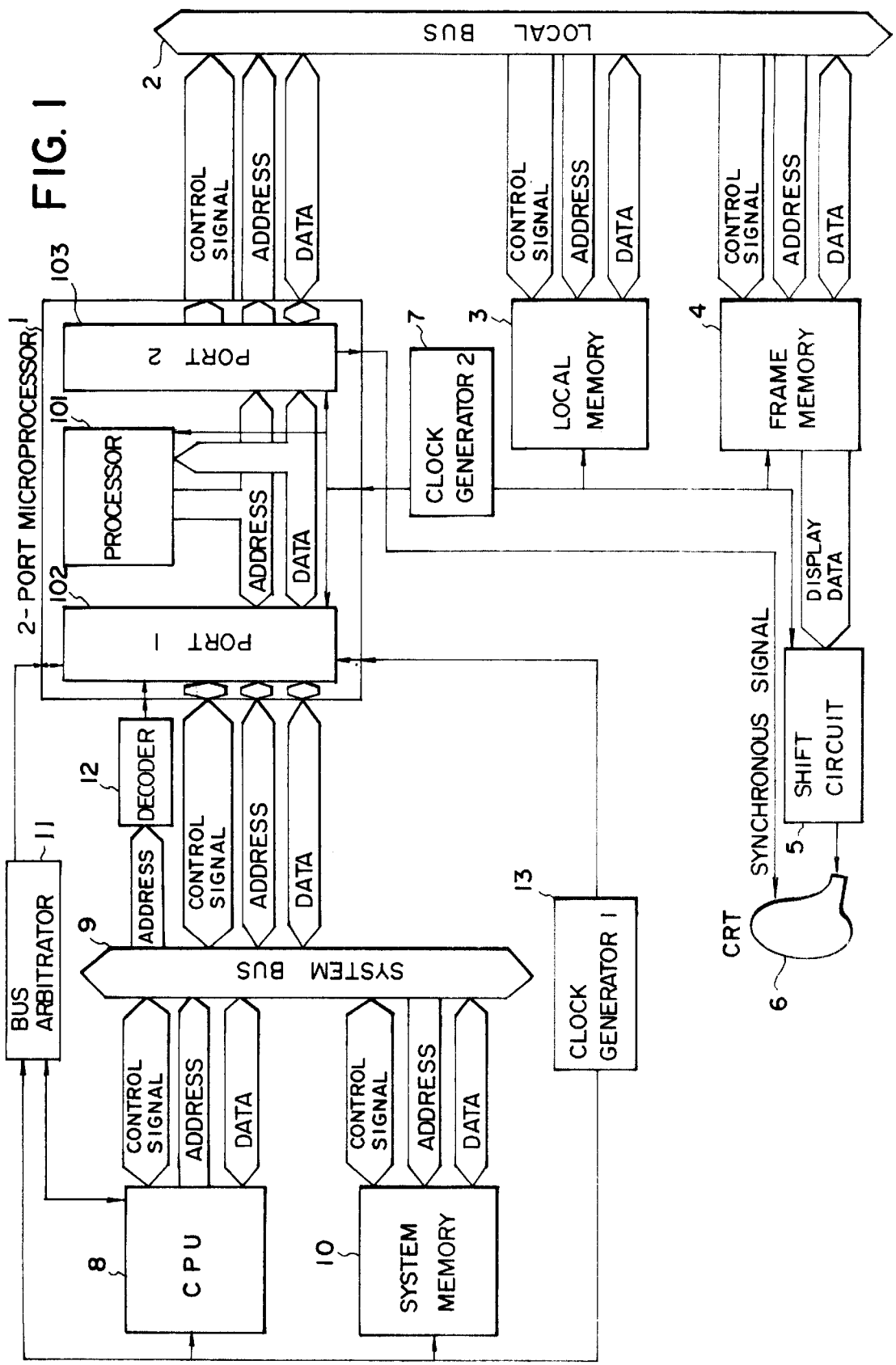
FIG. 1 is a block diagram of a graphics processing apparatus using a two-port microprocessor according to this invention.

The principles of this invention are particularly useful when embodied in a graphics processing apparatus (hereinafter called "apparatus") such as shown in FIG. 1. The apparatus of this embodiment is suitable for use in processing a large quantity of graphics data in a personal computer (PC), a printer, etc.

Figures 7, 8:
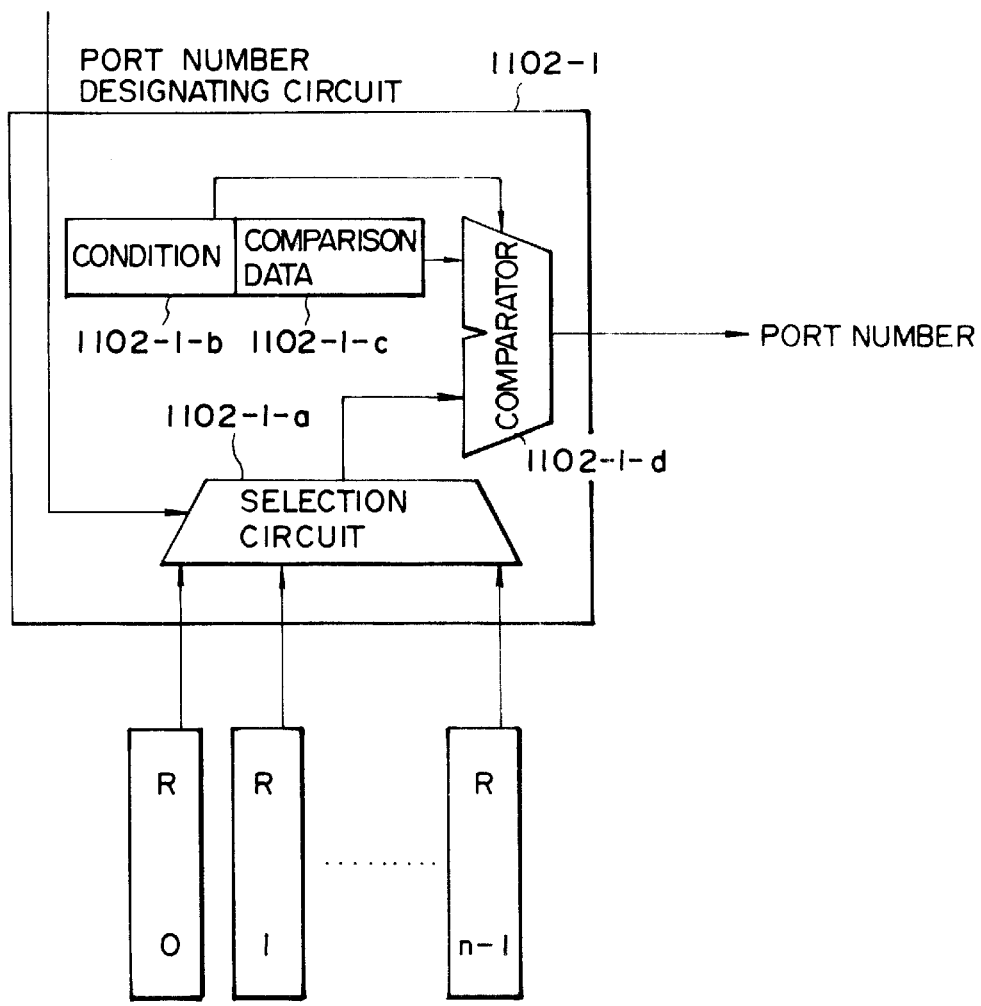
FIG. 7 is a block diagram of a port number designating circuit in a decoder 1102 in FIG. 6.
FIG. 8 is a table showing the mode of operation of the circuit of FIG. 7.

In FIG. 8, reference numeral 8 designates a central processing unit (CPU) for controlling the entire apparatus.

1 designates a two-port microprocessor for instructing a graphics drawing or a graphics display on a CRT 6. The microprocessor 1 includes therein a processor part 101 for executing a microinstruction, and two ports 102, 103.

3 designates a local memory for storing a microinstruction and data for graphics drawing.

4 designates a frame memory for storing graphics data.

5 designates a shift circuit for outputting display data of a plurality of picture elements or pixels read as the microprocessor 1 makes a graphics display access to the frame memory 4, to the CRT 6 one pixel by one pixel.

7 designates a clock generator for generating a clock signal for activating the two-port microprocessor 1, the local memory 3, the frame memory 4 and the shift circuit 5.

10 designates a system memory for storing microinstructions and data to be executed by the CPU 8 and also for storing graphics drawing commands and data to be processed by the microprocessor 1.

11 designates a bus arbitrator for requesting a bus for the CPU 8 upon receipt of a request signal, for use of the system bus 9, which signal is outputted by the microprocessor 1 before accessing to the system memory 10. Then, when a permission for use of the bus has been given, the bus arbitrator 11 gives this information to the microprocessor 1.

12 designates a decoder for decoding an address, outputted by the CPU 8, to output to the microprocessor 1 an interrupt request and a type of interrupt processing when the CPU 8 accesses a register in the processor part 102 or when the CPU 8 accesses the local memory 3 or the frame memory 4 connected to the local bus 2.

13 designates a clock generator for outputting a clock signal for adjusting the input/output timing of the microprocessor 1 to the system bus 9 and for activating the CPU 8, the system memory 10 and the bus arbitrator 11.

Figure 2:
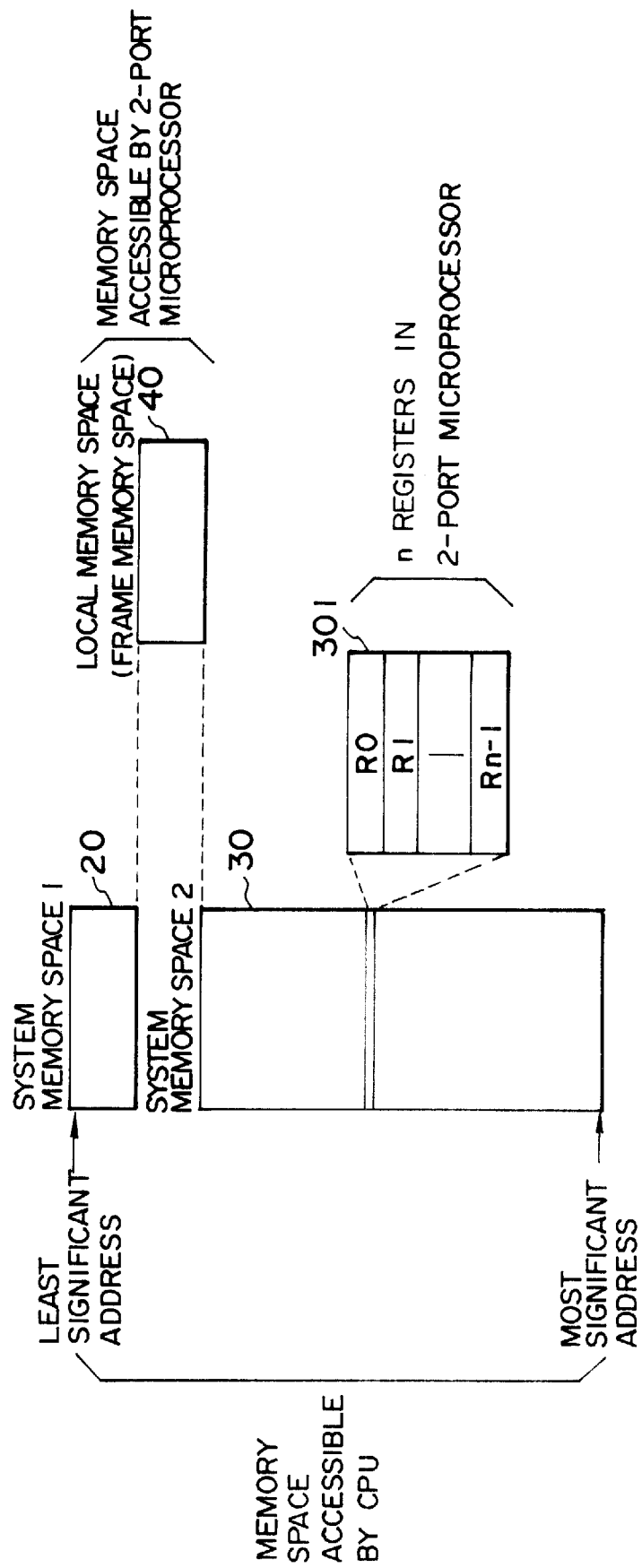
FIG. 2 is a memory map of the apparatus of FIG. 1.

The address allocating method for the system, local and frame memories of FIG. 1 will now be described with reference to FIG. 2.

The two-port microprocessor divides a self-addressable memory space into two halves and then allocates them for a first system memory space 20 and a local memory space 40.

A second system memory space 30 is accessible only from the CPU.

301 designates registers built in the two-port microprocessor. The registers 301 are allocated to addresses in the memory space of the CPU and is accessible from the CPU. In this registers 301, an R0 register and an R1 register are used for dedicated purpose.

Specifically, in FIG. 3, the R0 register is called a control register and stores information about the operation control of the two-port microprocessor. Namely, the most significant bit of the R0 register is called an operation control bit; if "0" is stored, the two-port microprocessor is in an inoperative state, and if "1" is stored, it assumes an operative state, in which microinstructions are being executed. 0 bit to 23 bit is a field in which a work list address may be stored; the work list is a list on which memory addresses of a drawing program and a graphics parameter to be executed by the two-port microprocessor are described. When the two-port microprocessor is to read the work list, the R0 register is used as an address register. But the field which is effective as an address is only the range of 0 bit to 23 bits. The R0 register is readable and writable as accessed from the CPU or as the instructions are executed by the two-port microprocessor.

The R1 register is called a program counter, and stores the memory address of a microinstruction to be read by the two-port microprocessor and increases the value automatically upon reading of the instruction. In the R1 register, 0 bit to 23 bits are effective so that the entire memory space of the two-port microprocessor may be used as a program area.

The graphics drawing method of the apparatus of FIG. 1 will now be described.

In this apparatus, the CPU creates a work list and graphics parameters in a memory, and the two-port microprocessor performs graphics drawing or the like with reference to this work list and the graphics parameters.

Figure 4:
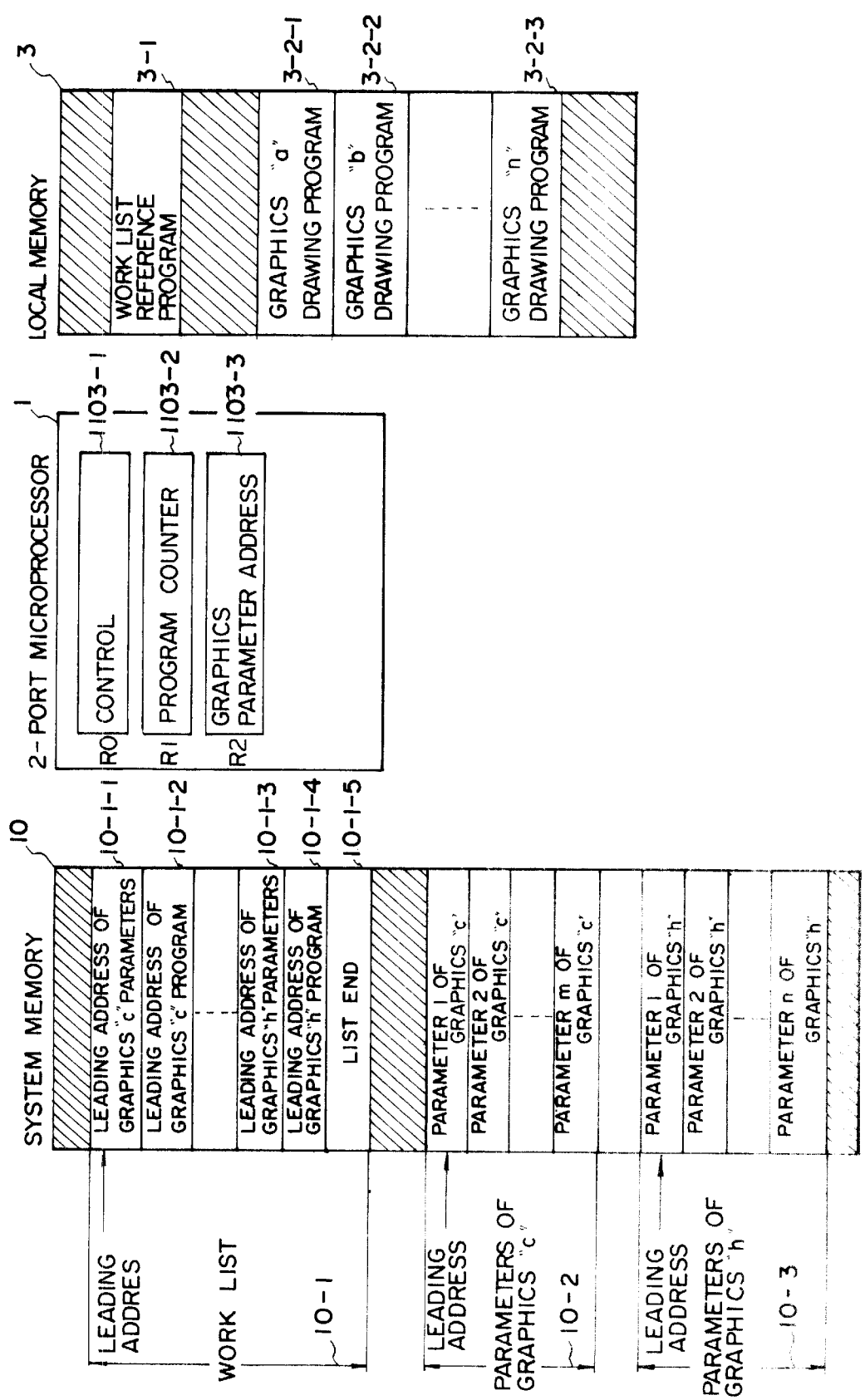
FIG. 4 is a memory map of commands and programs of the processor.

FIG. 4 shows a memory map of commands and programs which are both needed for the two-port microprocessor to perform a graphics drawing.

A work list 10-1 is a command stream or train which is to be given to the two-port microprocessor from the CPU and which has leading addresses of the memory storing the successive graphics parameters, and also leading addresses of the memory storing the corresponding drawing programs, covering the entire graphics to be drawn.

10-1-1 designates a leading address of the memory in which the parameters of a graphics "c" are stored, while 10-1-2 designates a leading address of the memory in which the drawing program of the graphics "c" is stored. In the addresses following the leading address 10-1-2, the parameters and program of another graphics are stored. 10-1-3 designates a leading address of the parameters of a final graphics "h"; and 10-1-4, a leading address of the drawing program of the final graphics "h". 10-1-5 designates a final work list, so called "a list end". The value of the list end may be determined optionally.

10-2 designates the parameters of the graphics "c"; the number and sequence of the parameters correspond to the drawing programs of the graphics "c".

Likewise, 10-3 designates the parameters of the graphics "h".

In the illustrated embodiment, the work list 10-1 and the graphics parameters 10-2, 10-3 are defined in the system memory 10; alternatively they may be defined in the local memory 3.

3-1 designates a work list reference program for reading a leading address of graphics parameters from the work list to initiate the execution of graphics drawing programs 3-2-1, 3-2-2, 3-2-3.

In this embodiment, the programs 3-1, 3-2-1, 3-2-2, 3-2-3 are defined in the local memory; alternatively they may be defined in the system memory 10.

The two-port microprocessor 1 stores an address of the work list in the R0 register 1101-1, and is usable as an address register when making a reference to the work list. The R1 register 1101-2 stores a program address. The R2 register 1101-3 is usable as an address register when reading the graphics parameters.

Figure 5:
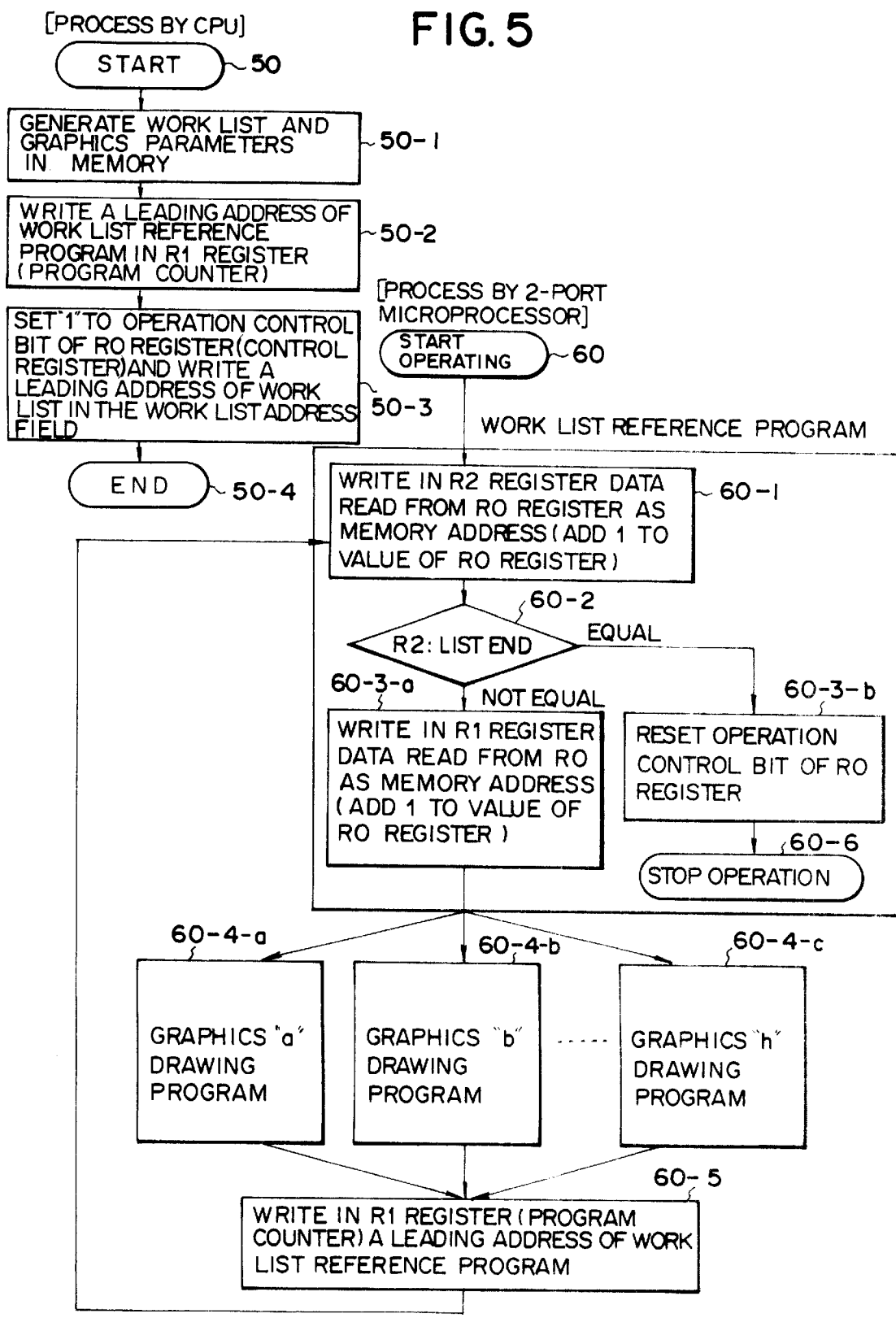
FIG. 5 is a flowchart showing the mode of operation of the processor.

The graphics drawing method of the two-port microprocessor will now be described with reference to FIG. 5.

50 designates a flowchart showing the procedure for the CPU to cause the two-port microprocessor to start graphics drawing processing.

Firstly, the CPU creates a work list and graphics parameters in the memory (50-1). The CPU then writes a leading address of the work list reference program in the R1 register (program counter) of the two-port microprocessor (50-2). Thereafter, the CPU writes "1" in the operation control bit in the R0 register (control register) of the two-port microprocessor, and also writes a leading address of the work list in the work list address field of the R0 register (50-3). The work by the CPU has thus been completed (50-4). Since the graphics drawing processing after this is assigned to the two-port microprocessor, the CPU can perform another processing during that time.

The two-port microprocessor starts its operation when the operation control bit of the R0 register becomes "1".

In FIG. .5, reference numeral 60 designates a flowchart showing the work of the two-port microprocessor. The two-port microprocessor executes the work list reference program as the R1 register is set at the step 50-2. Firstly, the two-port microprocessor reads data, with the work list address field of the R0 register being regarded as a memory address, and writes the data in the R2 register (60-1). In addition, the two-port microprocessor adds "1" to the value of the work list address of the R0 register. Then the two-port microprocessor compares the content of the R2 register and the list end value meaning the end of the work list (60-2). If they are equal, the two-port microprocessor rewrites the operation control bit of the R0 register to "0" (60-3-*b*) and thus assumes an inoperative condition (60-6). Otherwise, if they are not equal, the two-port microprocessor reads data, with the work list address field of the R0 register being regarded as a memory address, and writes the data in the R1 register (60-3-*a*). At the same time, "1" is added to the value of the work list address of the R0 register. According to the value of the R1 register rewritten at the step 60-3-*a*, the process of the two-port microprocessor is assigned to any of the graphics drawing programs of the steps 60-4-*a*, 60-4-*b*, 60-4-*c*. With each of these programs, it is possible to read the parameters from a memory with the R2 register being used as an address register. Upon completion of the drawing program, the R1 register is rewritten to a leading address of the work list reference program (60-5), returning to the process of step 60-1. The two-port microprocessor executes the above processing until the list end is detected from the work list.

Figure 6:
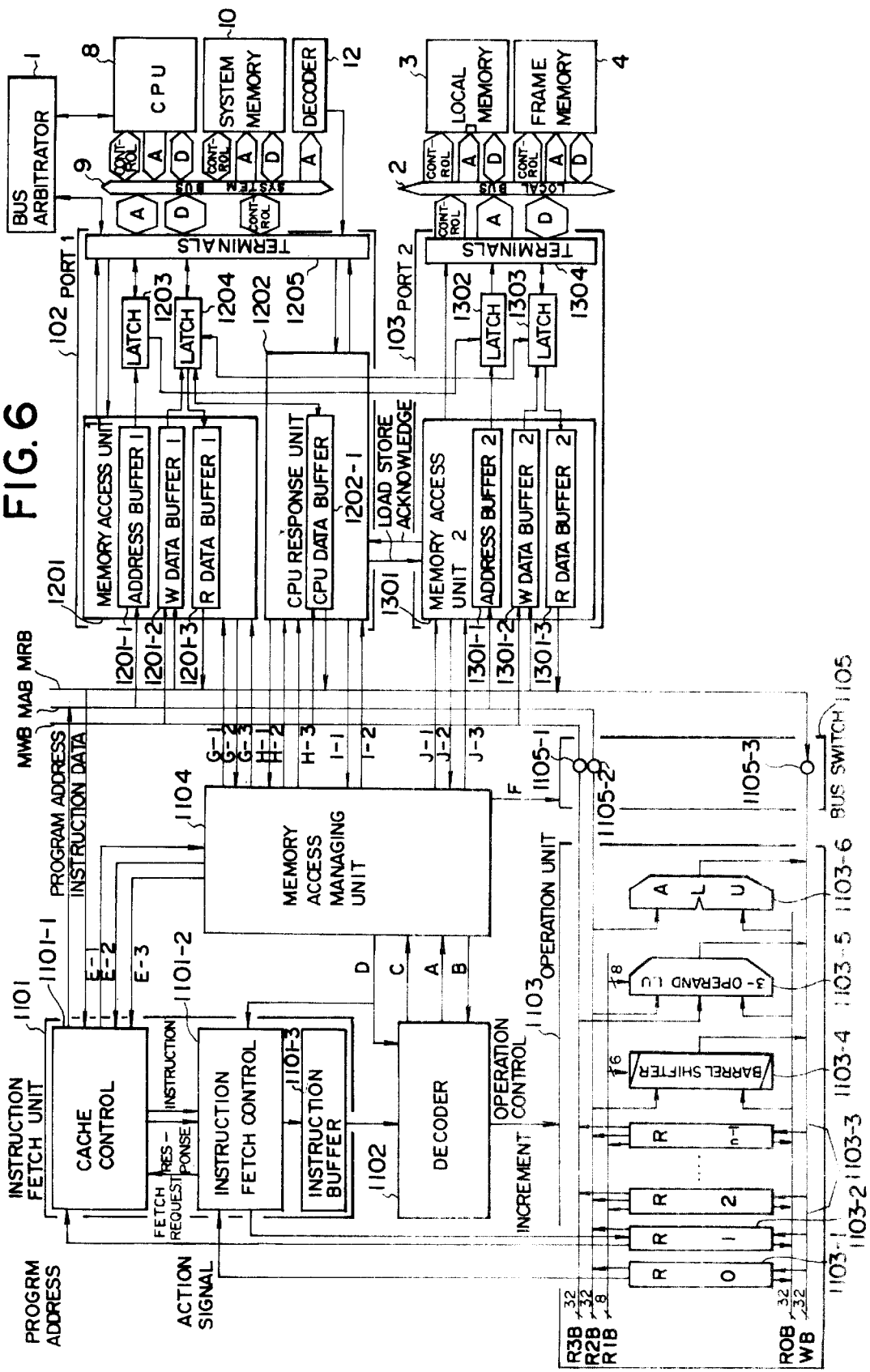
FIG. 6 is a block diagram showing the interior of the processor.

The interior of two-port microprocessor will now be described with reference to FIG. 6.

1101 designates an instruction fetch unit for fetching a microinstruction. The instruction fetch unit 1101 has a built-in cache memory, and fetches the instruction from an external memory if there exists no instruction corresponding to the cache memory.

1102 designates a decoder for decoding a instruction code given from the instruction fetch unit 1101 to control arithmetic operation.

1103 designates an arithmetic or operation unit which is composed of registers and an operation part and which executes an arithmetic and logic operation.

1104 designates a memory access managing unit for processing a memory access request generated in the two-port microprocessor and also an interruption of the CPU 8.

102 designates a port 1 through which an access response from the CPU 8 and an access to the system memory 10 are performed.

103 designates a port 2 through which accesses to the local memory 3 and the frame memory 4 are performed.

1105 designates a bus switch for performing a selective bus connection between the operation unit 1103 and the port 1 (102) and between the operation unit 1103 and the port 2 (103).

Following is a detailed description of the individual units.

The instruction fetch unit 1101 is composed of a cache control part 1101-1, an instruction fetch control part 1101-2, and an instruction buffer 1101-3. The pivot of the operation control of the instruction fetch unit 1101 is the instruction fetch control part 1101-2, which makes a decision on whether an instruction fetch should be executed or not, depending on the state of the operation control bit of the R0 register 1103-1 in the operation unit 1103. If the operation control bit is "0", the instruction fetch will not be executed; if the instruction fetch is "1", the instruction fetch will be executed.

The instruction fetch control part 1101-2 issues a fetch request to the cache control part 1101-1. The cache control part 1101-1 retrieves a cache memory in the cache control part 1101-1, with the R1 register 1103-2 in the arithmetic unit 1103 serving as a program address. If there exists an instruction in the cache memory, the cache control part 1101-1 returns a response signal to the instruction fetch control part 1101-2, along with the instruction code. The instruction fetch control part 1101-2 stores the instruction in the instruction buffer 1101-3 and makes an increment of the program address of the R1 register 1103-2 in the operation unit 1103. If there exists no instruction in the cache memory, the cache control part 1101-1 issues an instruction fetch request to the memory access managing unit 1104.

The decoder 1102 decodes an instruction given from the instruction fetch unit 1101, controls the reading and writing of the registers in the operation unit 1103, and also controls the operations therein. Further, in the case of a load or store (hereinafter called "load/store") instruction, the decoder 1102 gives an load/store signal and a port number to the memory access managing unit 1104. In the case of a load instruction, it gives to the memory access managing unit 1104 the number (load register number) of a register in which loaded data are to be written. The procedure discussed here is represented by reference character A in FIG. 6. The port number is a signal for designating whether a memory to access should be on the port 1 (102) or the port 2 (103).

The port designating method will now be described with reference to FIGS. 7 and 8.

FIG. 7 shows a port number designating circuit 1102-1 in the decoder 1102. As the port number designating circuit 1102-1 decodes a load/store instruction, a selection circuit 1102-1-*a* selects a value of one register designated from n number of registers in the operation unit 1103 by an address register number, and inputs the selected register value to a comparator 1102-1-*b*. To another input of the comparator 1102-1-*d*, comparison data 1102-1-*c* are inputted to be compared with the value according to a condition bit 1102-1-*b*, and the result of the comparison is outputted as a port number. The comparison data 1102-1-*c* correspond to an border address between the system memory space 20 and the local memory space 40 of the two-port microprocessor of FIG. 2, while the condition bit 1102-1-*b* makes a decision as to which side of the border address the system memory should be allocated to.

The relation between the condition bit 1102-1-*b* and the port number designating method is shown in a table of FIG. 8. If the condition bit is "0", the port 1 is designated when the data of the address register are equal to or larger than the comparison data, and otherwise the port 2 is designated. Reversely, if the condition bit is "1", the port 2 is designated when the data of the address register are equal to or larger than the comparison data, and otherwise the port 1 is designated. Either the comparison data or the condition bit is optionally settable so that the memory map of the memory space accessible by the two-port microprocessor can be optionally determined.

Returning to FIG. 6, when the decoder 1102 requests the memory access managing unit 1104 for load/store, a wait signal (D) is returned if its port is in use or reserved. Thus the instruction fetch unit 1101 and the decoder 1102 enter a wait status. As the load/store request is accepted, the decoder 1102 decodes a succeeding instruction.

In the case of a load instruction, as data are read from the memory, the memory access managing unit 1104 gives the decoder 1102 a wait signal (D), a register forced write signal and its register number. At that time the decoder 1102 holds the execution of an instruction in decodes so that the data read from the memory are written in the register with priority over the others. This circuit is shown in FIG. 9.

Figure 9:
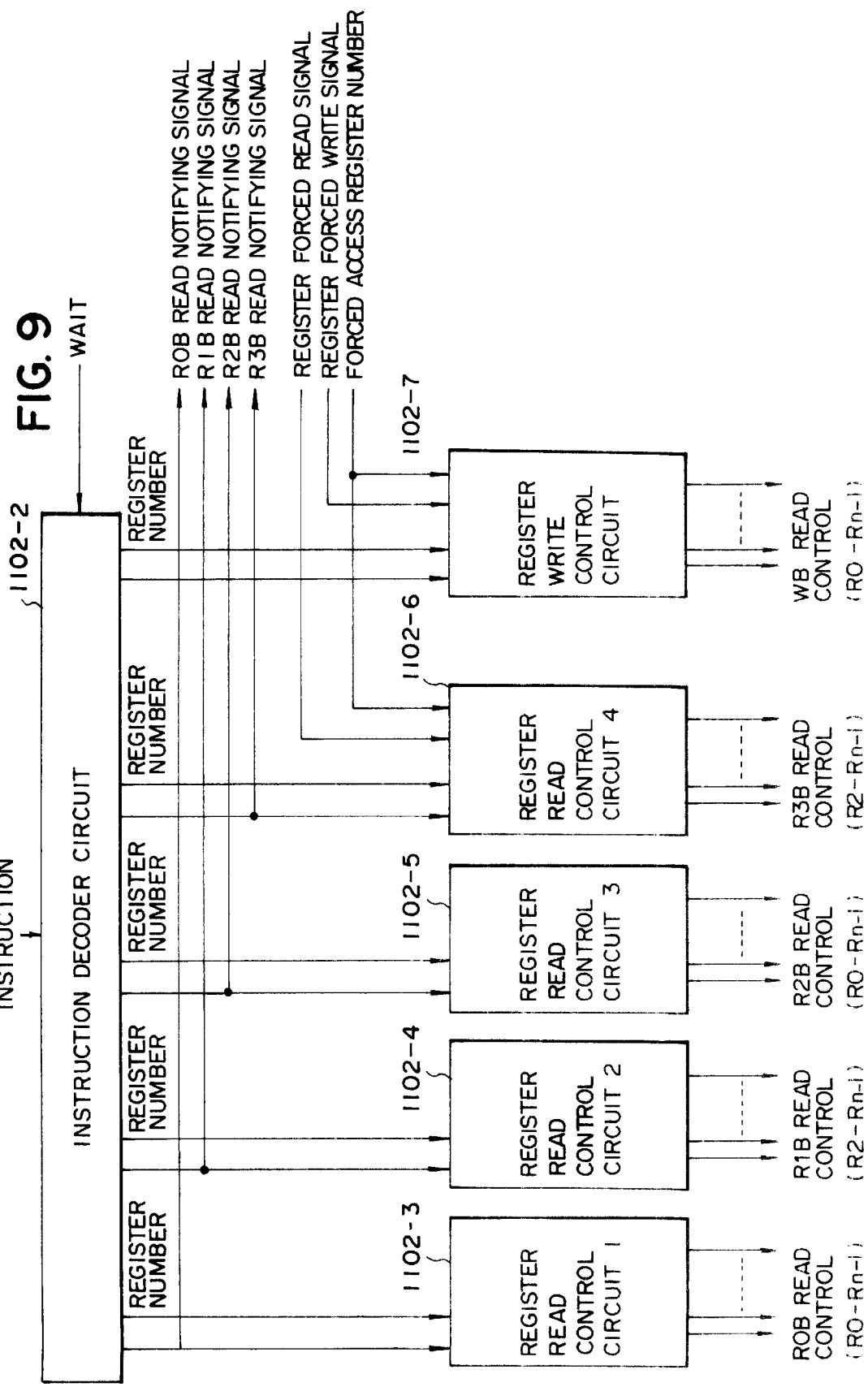
FIG. 9 is a block diagram of a register forced access executing circuit in the decoder 1102 of FIG. 6.

In FIG. 9, the reading and writing of the register by instructions are executed by an instruction decoding circuit 1102-2 which gives register numbers to control circuits 1102-3, 1102-4, 1102-5, 1102-6, 1102-7. Upon receipt of a register forced access signal and a wait signal from the memory access managing unit 1104, the instruction decoding circuit 1102-2 stops executing the instruction, and a register read control circuit 4 (1102-6) or a resister write control circuit 1102-7 executes reading from or writing in a register designated by the forced access register number.

Until data are written from a memory to a register after a load instruction is accepted by the memory access managing unit, there is the possibility that the register is used according to the execution of a subsequent instruction. In this case, the execution of such instruction must be waited until data are loaded from the memory into the register. To this end, the decoder 1102 gives a read register number to the memory access managing unit 1104 earlier than executing the instruction, for comparison with a load register number. If the two values agree with each other, a wait signal (D) is returned to wait executing the instruction.

The operation unit 1103 will now be described with reference to FIG. 6 again.

As discussed above, the R0 register 1103-1 and the R1 register 1103-2 among n number of registers are for dedicated use, and the R2 register to Rn-1 register are general registers 1103-3. A barrel shifter 1103-4 combines two sets of 32-bit data to provide 64-bit data, and selects 32-bit data therefrom while shifting the 64-bit data a number of bits which is designated by the 6-bit shift number. A three-operand logic unit (three-operand LU) 1103-5 performs 256 kinds of logical operations between three input data. An arithmetic and logic unit (ALU) 1103-6 performs arithmetic and logic operations between two input data. Internal buses include four buses (R3B, R2B, R1B, R0B) for reading and a single bus (WB) for writing; among these internal buses, the bus R1B is used to provide the shift number of the barrel shifter 1103-4 and to designate the operation mode of the three-operand LU 1103-5. When executing a store instruction, the bus R2B is used for address transfer, and the bus R3B is used for data transfer. When executing a load instruction, the bus R2B is used for address transfer, and the bus WB is used for data transfer.

Figure 10:
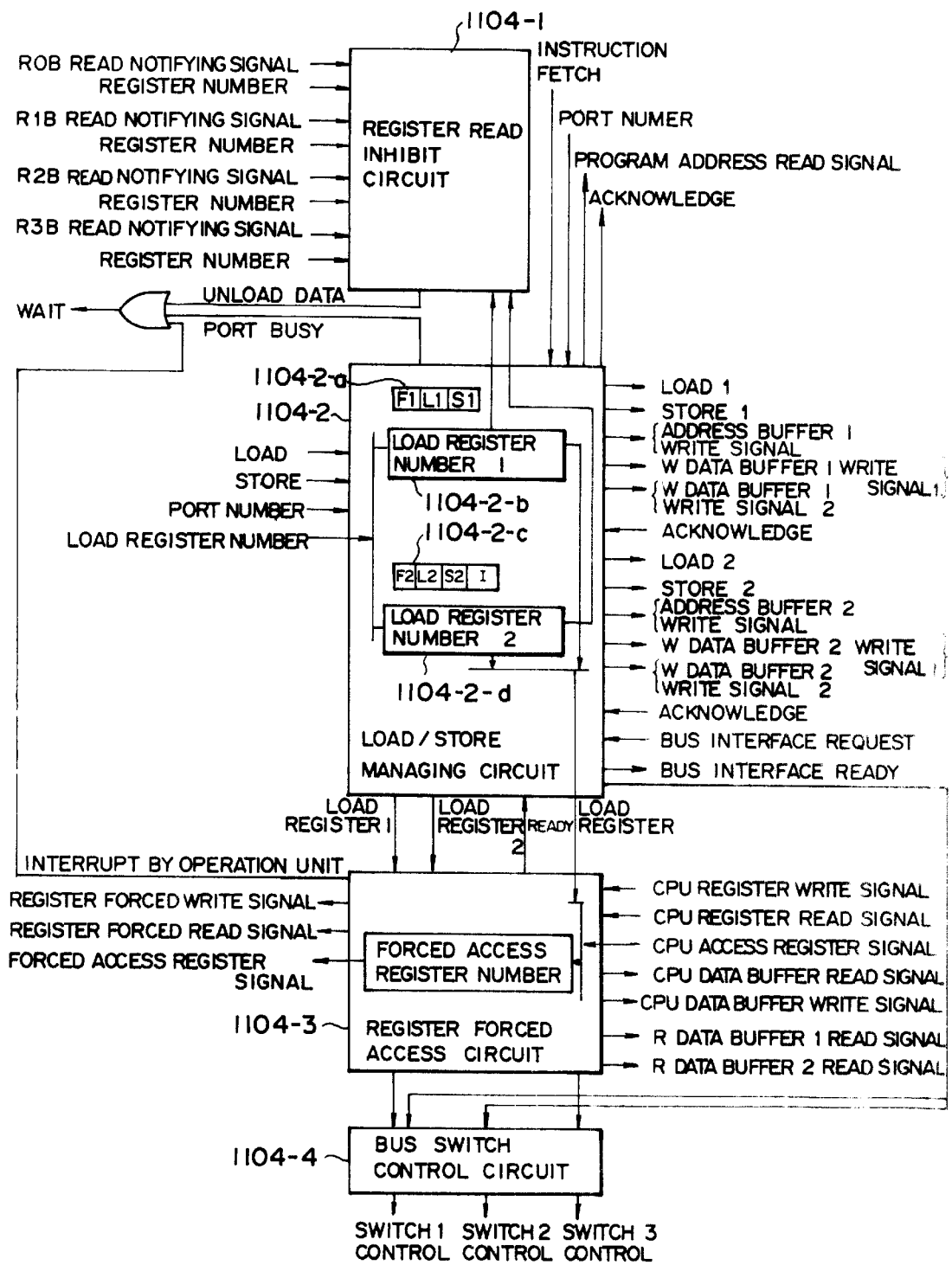
FIG. 10 is a block diagram showing the interior of a memory managing unit 1104 in FIG. 6.

Now the memory access managing unit 1104 will be described with reference to FIG. 10.

In connection with a load/store managing circuit 1104-2, 1104-2-*a* means a 3-bit status register 1 which indicates the state of execution with the port 1; F1, an instruction fetch; L1, load; and S1, store. If "1" is set at any bit in the register 1, it means that the port 1 is in operation or working associated with the bit of "1". 1104-2-*b* designates a register for storing the number of a register in which data are to be written by executing a load instruction.

Likewise, for the port 2, the load/store managing circuit 1104-2 includes a status register 2 (1104-2-*c*) and a load register number register 2 (1104-2-*d*). But the status register 2 (1104-2-*c*) is a 4-bit register and has, in addition to bits F2, L2, s2, a bit I that means under execution of interface.

When a load/store request and a port number are given from the decoder 1102, the load/store managing circuit 1104-2 checks the status registers 1104-2-*a*, 1104-2-*c* for the designated port, and if the port is in operation, the managing circuit 1104-2 immediately gives to an OR circuit 1104-5 a signal indicating that the port is in use. As a result, a wait signal is outputted to wait executing a load/store instruction that is about to be executed. In every bit of the status registers 1104-2-*a*, 1104-2-*c* is "0", the bit of a load or a store is set to "1". Further, in the case of a load request, a load register number outputted from decoder is written in the load register number registers 1104-2-*b*, 1104-2-*d* of the designated port.

The load/store managing circuit 1104-2 requests a load or store operation to the designated port, and outputs a control signal for writing an address in an address buffer in the port. In the case of store, it also outputs a control signal for writing data in a data buffer in the port.

A memory access occurs not only in the case of a load/store instruction, but when a mishit of an instruction cache is happened. The instruction fetch unit outputs an instruction fetch request and a port number. The load/store managing circuit 1104-2 checks the status registers 1104-2-*a*, 1104-2-*c* of the designated port. If the port is not in use, the load/store managing circuit 1104-2 gives to the instruction fetch unit a signal to read a program address, and writes the program address in an address buffer in the port.

When an acknowledge is returned from the designated port, the load/store managing circuit 1104-2 clears or resets the store bit S1 or S2 of the status registers 1104-2-*a*, 1104-2-*c* of the port to "0" in the case of a store instruction. In the case of a load instruction, the load/store managing circuit 1104-2 instructs the register forced access circuit 1104-3 to perform such processing, and clears the load bit L1 or L2 of the status registers 1104-2-*a*, 1104-2-*c* of the designated port to "0".

The load/store managing circuit 1104-2 is also operable at the time of local bus access by the CPU. Upon receipt of a bus interface request from the port 1, the port 2 will be unused, whereupon the managing circuit 1104-2 sets the bit I of the status register 2 (1104-2-*c*) and returns a bus interface ready to the port 1. When the bus interface request is canceled upon termination of using the local bus by the CPU, the managing circuit 1104-2 clears the interface bit I of the status register 1104-2-*c*.

1104-3 designates a register forced access circuit. After data have been written from the memory to the data buffer in the port by the execution of the load instruction, the register forced access circuit 1104-3 accepts a load register request and a load register number from the load/store managing circuit 1104-2 and causes the decoder 1102 to execute a forced register writing. At that time the register forced access circuit 1104-3 also controls the reading of the data buffer in the port.

The register forced access circuit 1104-3 is also operable when the CPU has accesses to the register in the two-port microprocessor. Upon accept of the register write or read signal and the register number from the CPU, the register forced access circuit 1104-3 causes the decoder 1102 to execute a forced register writing or reading. At that time the register forced access circuit also controls the writing and reading of a data buffer 1202-1 which temporarily stores reading data to or writing data from the CPU in the port 1.

1104-4 designates a bus switch control circuit for performing a bus connection control for data transfer between the operation unit and each of the ports during the load/store executing.

1104-1 designates a register read inhibition circuit for accepting from the decoder 1102, before execution of the succeeding instruction, the register number to be read, and compares the register number with the load register number held by the load/store managing circuit 1104-2. Because there are four read buses in the operation unit 1103, the register read inhibition circuit 1104-4 compares at most four read register numbers and the load resister number. If there is an agreement in number, the register read inhibition circuit 1104-4 prohibits executing the instruction that is about to be executed.

The port 1 (102) will now be described with reference to FIG. 6 again.

The port 1 (102) is composed of a memory access unit 1201, a CPU response unit 1202, an address latch 1203, a data latch 1204, and terminals 1205.

Upon receipt of a load/store instruction (G-1) from the memory access managing unit 1104, the memory access unit 1201 executes accessing to the system memory 10. In order to hold the address and store data given from the operation unit 1103, the memory access unit 1201 has an address buffer 1 (1201-1) and a W data buffer 1 (1201-2). The memory access unit 1201 has also an R data buffer 1 (1201-3) for holding the data read from the system memory 10.

The memory access unit 1201 acquires the right of use of the system bus 9 before accessing a memory. Upon receipt of a response from the system memory 10 after having started accessing with the right of use of the system bus 9, the memory access unit 1201 returns an acknowledge (G-2) to the memory access managing unit 1104. In the case of load, the R data buffer 1 (1201-3) is read (G-3) by the memory access managing unit 1104.

The CPU response unit 1202 is operable when the CPU 8 accesses the registers 1103-1 to 1103-3 in the two-port microprocessor and also when the CPU 8 accesses the local memory 3 or the frame memory 4.

In the case of access to the registers, the CPU response unit 1202 outputs a register access signal and a register number (H-1) to the memory access managing unit 1104. In the case of writing in the registers, the memory access managing unit 1104 causes the instruction fetch unit 1101 and the decoder 1102 to wait operating, and reads (H-2) the data of the CPU data buffer 1202-1 to the bus MRB to perform forced writing to the designated register. In the case of reading the register, the memory access managing unit 1104 causes also the instruction fetch unit 1101 and the decoder 1102 to wait operating, and forcedly reads the register to perform writing (H-3) to the CPU data buffer 1202-1. The CPU response unit 1202 writes the data in a latch 1204 and returns an acknowledge to the CPU, thus causing the CPU to perform data reading.

When the CPU accesses the local memory 3 or the frame memory 4, the CPU response unit 1202 outputs a bus interface request (I-1) to the memory access managing unit 1104. When the local bus 2 will be free in the next memory cycle, the memory access managing unit 1104 returns a bus interface ready (I-2) to the CPU response unit. The CPU response unit 1202 outputs a load or store signal to a memory access unit 1301 and transfers an address from a latch 1203 in the port 1 (102) to a latch 1302 in the port 2 (103). In the case of store, the CPU response unit 1202 transfers data from the latch 1204 in the port 1 (102) to a latch 1303 in the port 2 (103). Accessing to the local memory 3 or the frame memory 4 is executed by the memory access unit 2 (1301). In the case of store, when the memory accessing is started, the CPU response unit 1202 returns an acknowledge to the CPU 8 to terminate the bus cycle of the CPU 8. In the case of load, after completion of the memory accessing, the CPU response unit 1202 transfers to the latch 1204 in the port 1 (102) the data read in the latch 1303, and returns an acknowledge to the CPU 8, thus causing the CPU 8 to read the data from the system bus 9.

Now, the port 2 (103) will be described.

The port 2 (103) is composed of a memory access unit 2 (1301), an address latch 1302, a data latch 1303, and terminals 1304.

Upon receipt of requests from the memory access managing unit 1104 or the CPU response unit 1202, the memory access unit 2 (1301) executes accessing to the local memory 3 or the frame memory 4. In order to hold the address and store data given from the operation unit 1103, the memory access unit 2 (1301) has an address buffer 2 (1301-1) and a W data buffer 2 (1301-2). Further, in order to hold the data read from the local memory 3 or the frame memory 4, the memory access unit 2 (1301) has also an R data buffer 2 (1301-3). The local bus 2 is a synchronous bus which uses a clock of sextuple the internal clock for a single memory cycle.

Figure 11:
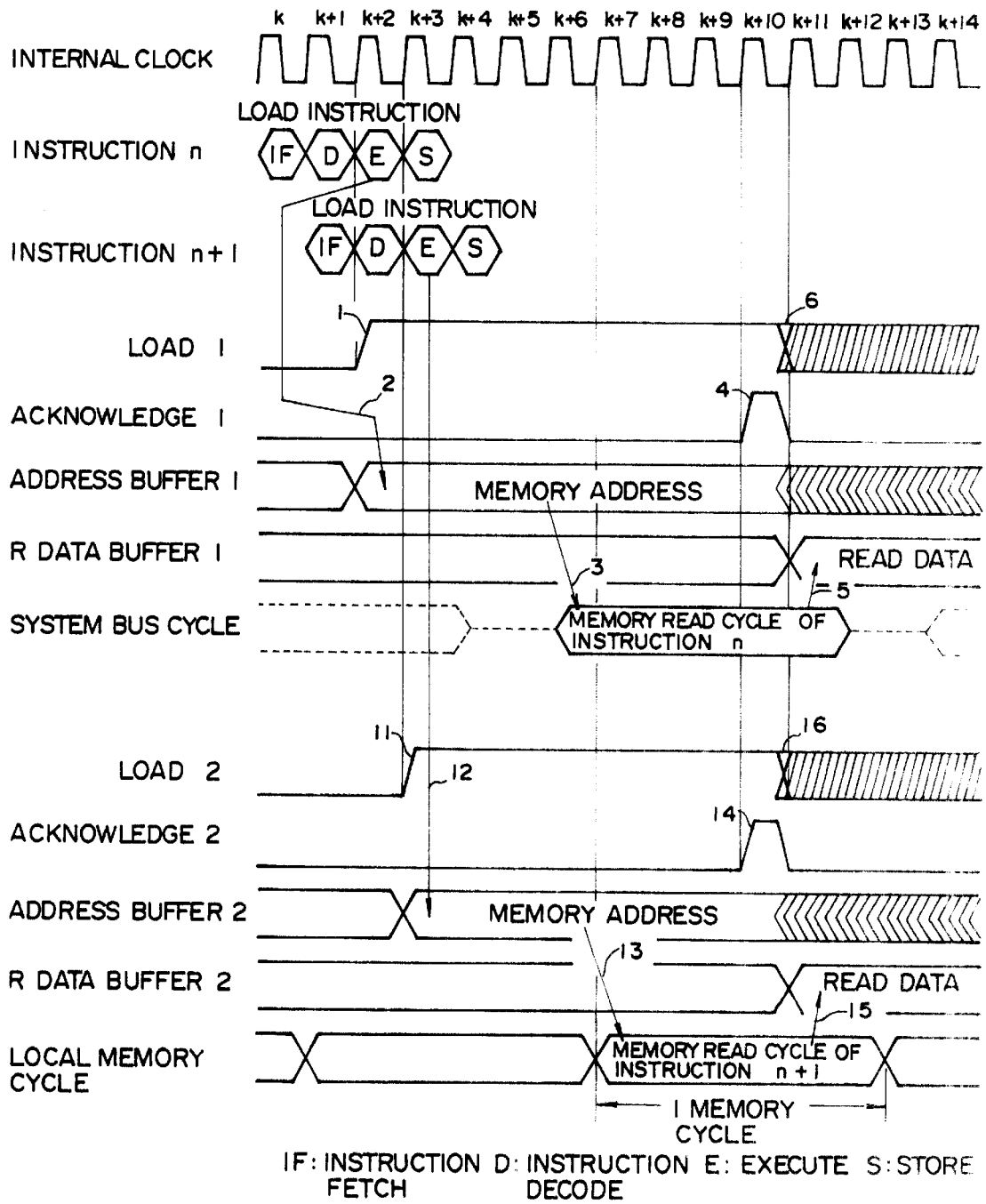
FIGS. 11 through 13 are memory access timing diagrams of the processor of FIG. 6.

The simultaneous access to two memories of the two-port microprocessor will now be described with reference to FIG. 11.

Assume that an instruction n fetched from an instruction chache with an internal clock k is a load instruction, with the port 1 designated, as the result that the instruction is decoded. The memory access managing unit checks the operation state of the port 1 and, if discriminated that the port 1 is free, outputs a load 1 (designated by 1 in FIG. 11) to the memory unit 1. Further, the operation unit reads onto the bus the content of the register designated by the address register, and the memory access managing unit connects the bus switch to write (2) in the address buffer 1 an address on the bus.

The memory access unit 1 makes a request for acquiring the system bus, causes the address buffer 1 to output the memory address to the system bus, when a right to use the bus is given as indicated by an arrow 3, to execute a reading access to the system memory. When a response is returned from the system memory, the memory access unit 1 returns an acknowledge 1 (4) to the memory access managing unit. The memory access unit 1 also reads data from the system bus to an R data buffer 1, as indicated by an arrow 5. Upon receipt of the acknowledge 1 (4), the memory access managing unit performs a forced writing over the register in the operation unit to cancel (6) the load 1.

Also assume that an instruction n+1 fetched with an internal clock k+1 is a load instruction. The memory access managing unit checks the operation state of the port 2, and outputs a load 2 (11) to the memory access unit 2. Further, the operation unit reads in the bus the content of the register designated by the address register, and the memory access managing unit writes (12) it in the address buffer of the memory access unit 2. The memory access unit 2 outputs (13) the memory address in the memory cycle starting at a clock k+7, and reads (15) the data in the R data buffer 2 at a clock k+11. The memory access managing unit reads the R data buffer 2 in response to an acknowledge 2 (14) of clock k+10, and performs forced writing on the register in the operation unit.

Accordingly, in the two-port microprocessor, since the memory access managing unit manages the operation states of the two ports and has the function of performing register forced writing of the data read from the memory, memory accesses simultaneously using two ports can be achieved.

The register access in the two-port microprocessor by the CPU will now be described.

Figure 12:
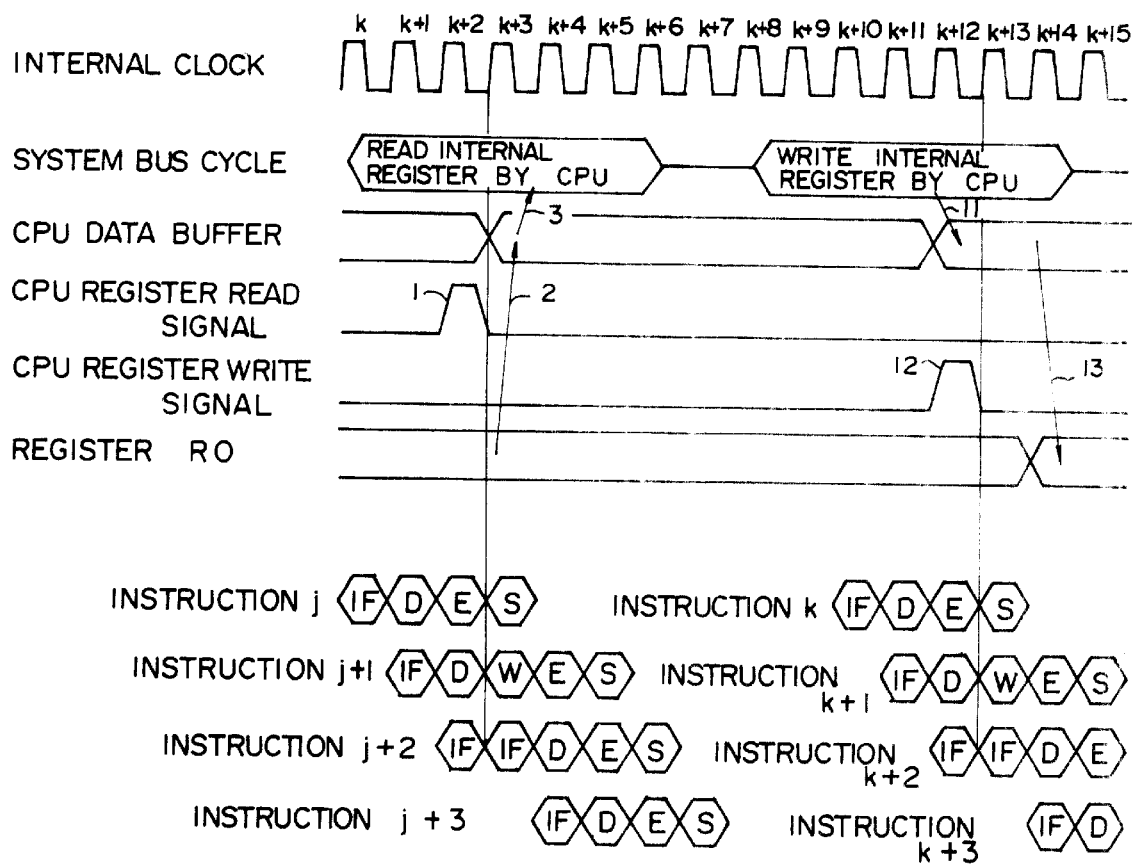

FIG. 12 is a timing diagram showing the manner in which the CPU reads the content of the R0 register in the two-port microprocessor, modifies it and writes it back in the R0 register. When an external decoder 12 receives a register read request from the CPU, the CPU response unit outputs a CPU register read signal (1 in FIG. 12) and a register number to the memory access managing unit. Immediately in response to this, the memory access managing unit causes the instruction fetch unit and the decoder to wait operating (an instruction j+1 is caused to wait in FIG. 12), forcedly reads the R0 register in the operation unit, and writes (2) the data in the CPU data buffer. The CPU response unit outputs the data of the CPU data buffer to the system bus and returns a response to the CPU. The CPU modifies the read data and subsequently starts a writing cycle.

Upon receipt of a register write request from the CPU, the CPU response unit reads (11) the data on the system bus into the CPU data buffer, and outputs (12) a CPU register write signal and a register number to the memory access managing unit. The memory access managing unit immediately causes the instruction fetch unit and the decoder to wait operating (an instruction k+1 is caused to wait in FIG. 12), and performs a forced writing (13) in the R0 register in the operation unit.

As is apparent from the execution stages of a microinstruction shown in FIG. 12, forced reading (2) is executed in a cycle subsequent to the cycle in which the CPU register read signal (1) is given, and forced reading (13) is executed in a cycle next to the cycle subsequent to the cycle in which the CPU register write signal (12) is given.

The accessing to the local memory and the frame memory by the CPU will now be described.

Figure 13:
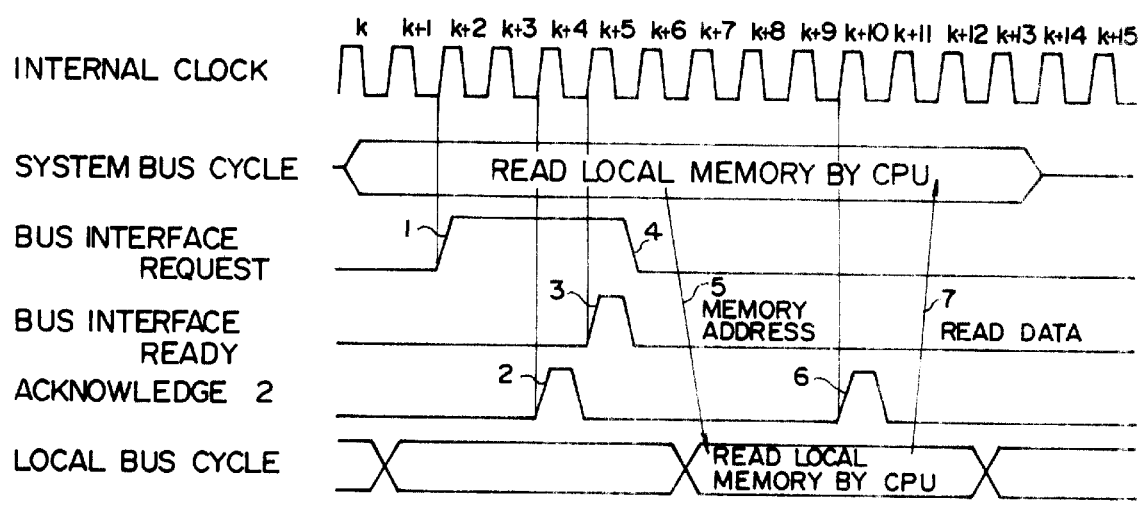

FIG. 13 is a timing diagram showing the manner in which the CPU makes a read access to the local memory. When a local memory access request from the CPU is received by the external decoder, the CPU response unit outputs a bus interface request (1) to the memory access managing unit.

The memory access managing unit checks the operation state of the port 2. As an acknowledge 2 (2) is returned from the memory access unit 2 at a clock k+4 and as the status register of the port 2 in the memory access managing unit is cleared, the memory access managing unit receives a bus interface request, sets the bit I of the status register and returns (3) a bus interface ready to the CPU response unit. The CPU response unit cancels (4) the bus interface request, transfers to an address latch in the port 2 the memory address read in an address latch in the port 1, and issues a load request to the memory access unit 2. The memory access unit 2 reads the data from the local memory and returns (6) an acknowledge to the CPU response unit. The CPU response unit transfers to a data latch in the port 1 the data read in a data latch in the port 2 and outputs (7) it onto the system bus. Upon receipt of the response from the port 1, the CPU reads the data on the system bus.

The read/modify/write instruction of the two-port microprocessor will now be described.

Figure 14:
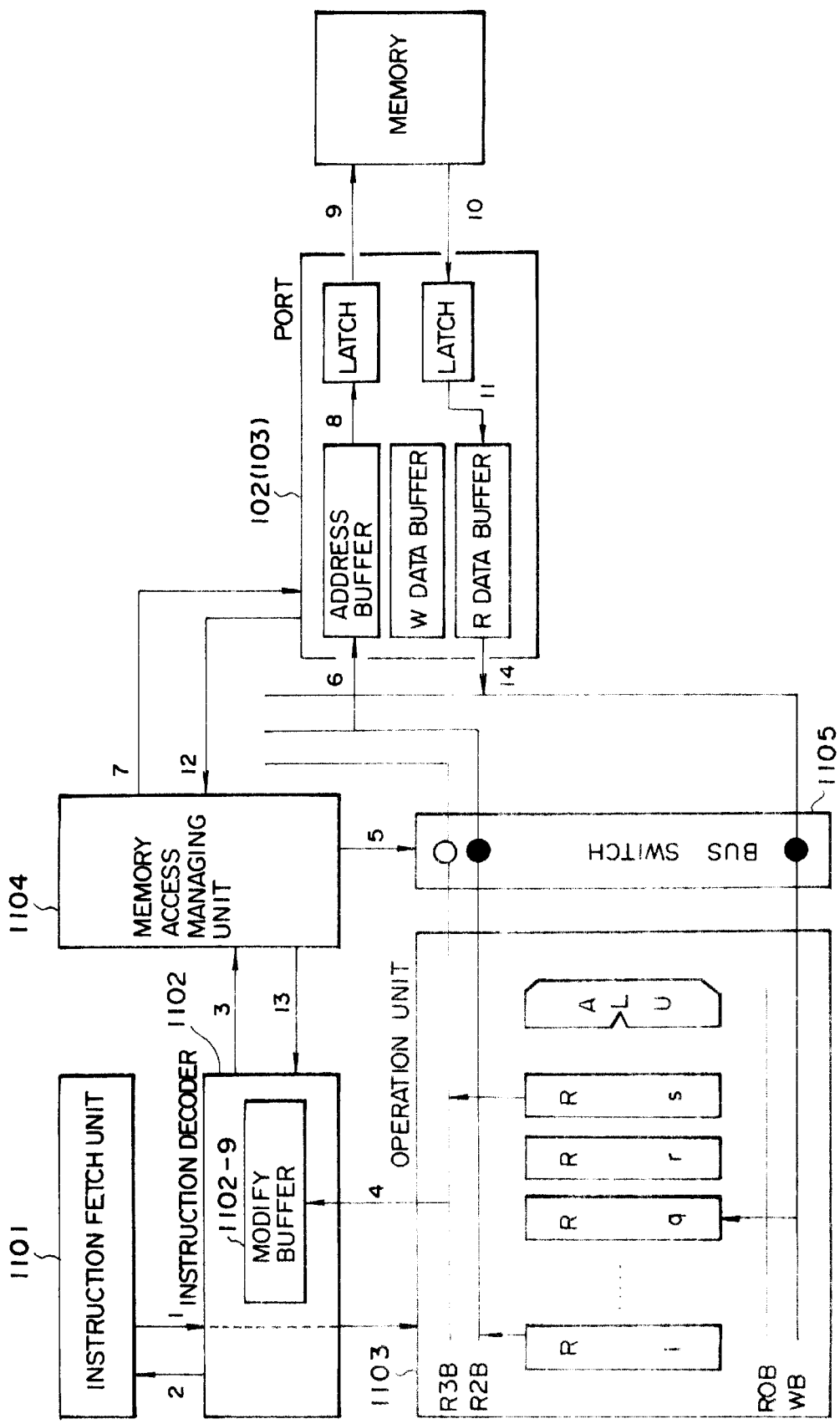
FIGS. 14 through 16 are diagrams showing the manner in which a read/modify/write instruction is executed.
Figure 15:
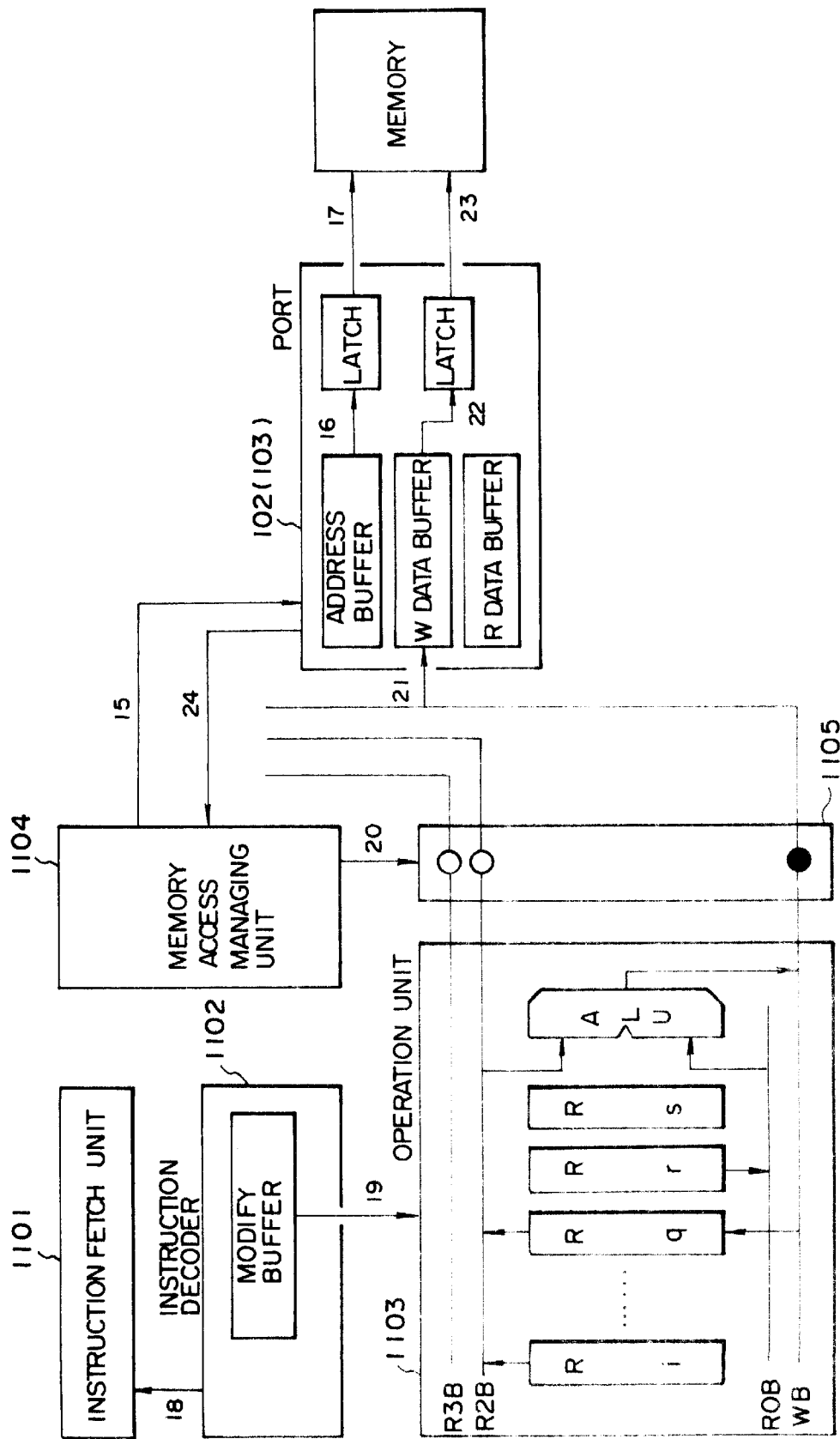
Figure 16:
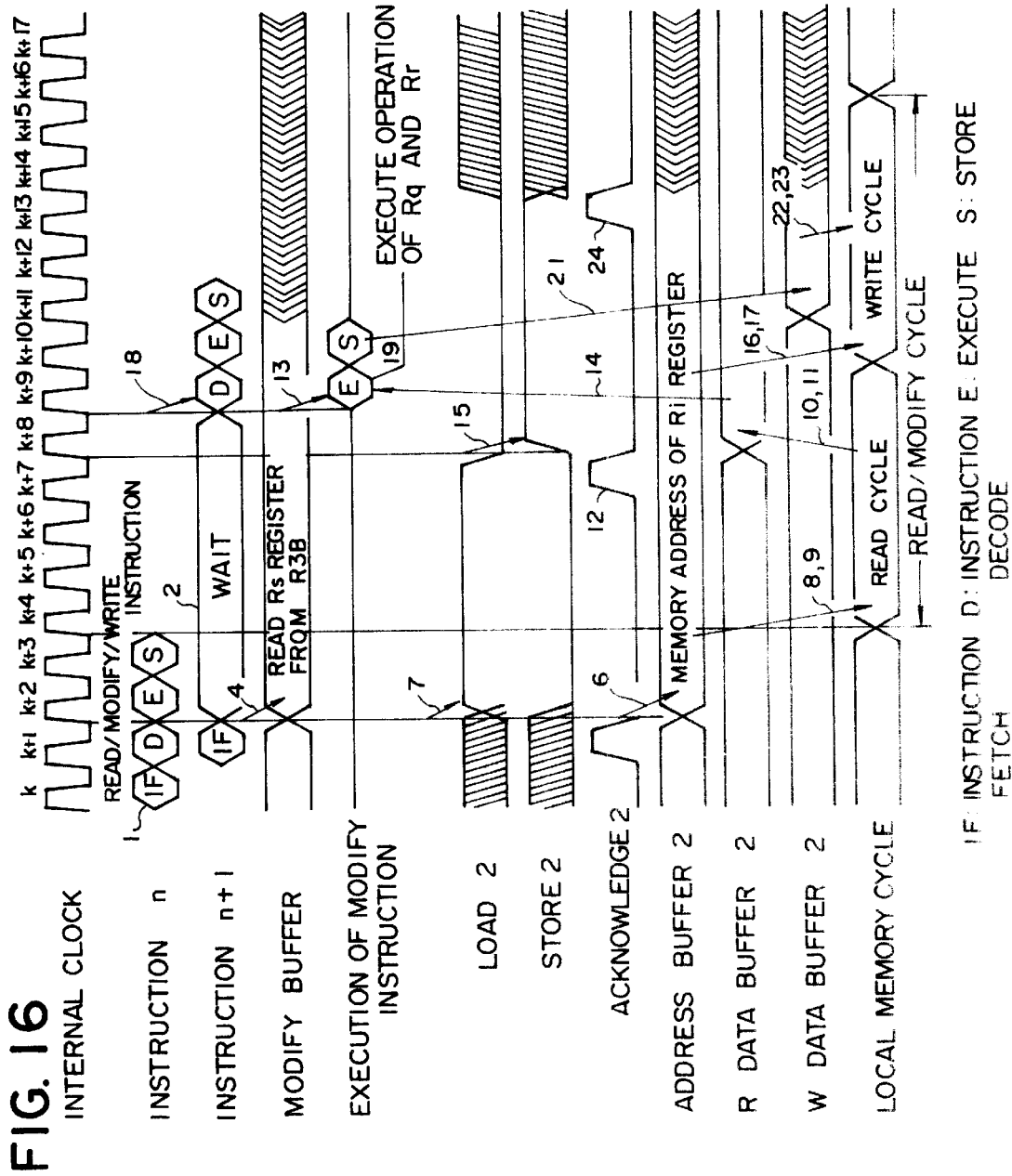
Figure 17:
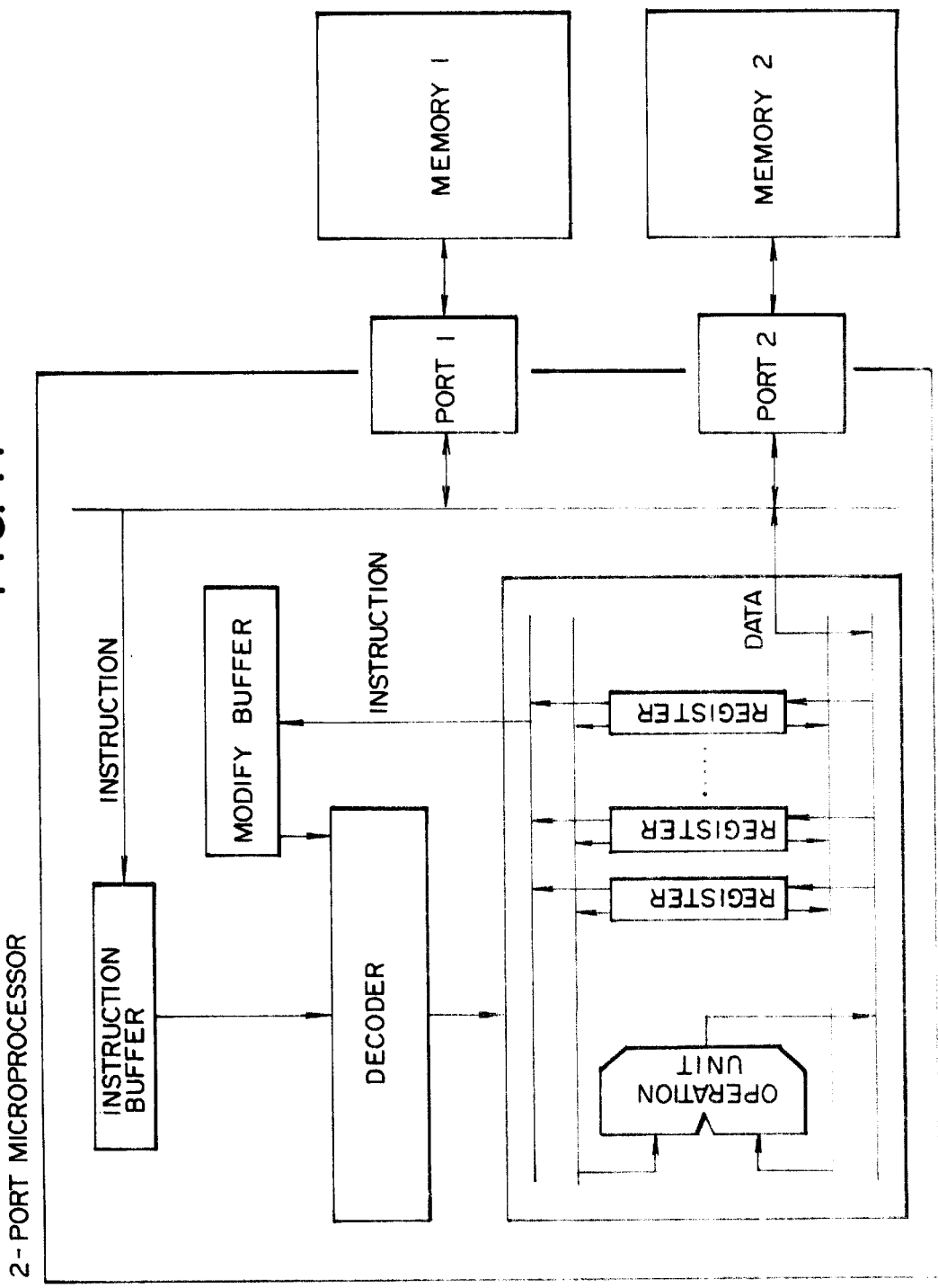
FIG. 17 is a block diagram showing the concept of this invention using a modified buffer.

This instruction is an instruction for performing an operation over the data read from the memory and for writing the result of the operation back to the original memory address at two successive memory cycles. FIG. 14 shows the signal transfer between the units during the read cycle of the read/modify/write instruction. FIG. 15 shows the signal transfer between the units during the subsequent modify/write cycle. FIG. 16 is a timing diagram showing the operations of the various parts of FIGS. 14 and 15. FIG. 17 shows the concept of the microprocessor of this invention using a modify buffer.

First of all, the read cycle will be described with reference to FIGS. 14 and 16.

Having decoded the read/modify/write instruction (1 in FIGS. 14 and 16) fetched with the internal clock k, the instruction decoder 1102 immediately returns a wait signal (2) to the instruction fetch unit. This signal continues being outputted to the operation unit until the modify instruction is executed. The instruction decoder causes the instruction fetch unit to output the content of Ri register as the memory address onto the bus R2B, and gives (3) a load request, a store request and a port number to the memory access managing unit. Further, the instruction decoder causes the operation unit to output the content of Rs register onto the bus R3B to fetch (4) the data into the modify buffer 1102-9 in the instruction decoder. Meanwhile, upon receipt of a load/store request, the memory access managing unit sets to "1" both a load bit and a store bit of the status register in the designated port, outputs a load signal (7), controls (5) the bus switch to write (6) the memory address in the address buffer. The designated port latches (8) the memory address in the address buffer, outputs (9) it to the memory, and starts the read cycle. When data are read from the memory, the port latches (10) it, transfers (11) it to the R data buffer, and returns an acknowledge (12) to the memory access managing unit. The memory access managing unit gives (13) a forced write signal to the instruction decoder, controls the bus switch to write (14) in Rq register the data read from the R data buffer.

The subsequent processes will now be described with reference to FIGS. 15 and 16.

The memory access managing unit resets the load bit of the status register to "0", and gives (15 in FIGS. 15 and 16) a store signal to the port. The port latches (16) a memory address in the address buffer and outputs (17) it to the memory to start the write cycle.

The instruction decoder cancels (18) the wait signal to the instruction fetch unit, and causes the operation unit to execute (19) the modify/buffer instruction. This example presents an instruction for performing an operation in the ALU or the contents of the Rq register and the Rr register and for storing the result of the operation in the Rq register.

The memory access managing unit controls (20) the bus switch at the timing at which the ALU outputs the result of the operation, so as to write (21) the data on the bus WB into the W data buffer in the port.

The port latches (22) the data in the W data buffer and outputs (23) the data to the memory. Further, the port returns an acknowledge (24) to the memory access managing unit and clears the store bit of the status register to "0".

As shown in the block diagram of FIG. 17, independently of the ordinary instruction buffer for holding the instruction of a program, a modify buffer may be provided for holding a sub-instruction preset in any one of the registers. If the execution of the sub-instruction is needed as a result of decoding an instruction in the instruction buffer, an instruction in the modify buffer may be immediately decoded corresponding to the result of the instruction decoding of the instruction buffer, so that the result of modification of the data read in the read cycle can be in time for the next write cycle, as is apparent from the timing diagram of FIG. 16. Further, the instruction to be fetched in the modify buffer is readable from an optional one of the registers R2 through Rn-1. In FIG. 17, the modify buffer is illustrated as an independent block from the block of the decoder for clarity of the concept.

The rectangular transfer method from the system memory to the frame memory will now be described with reference to FIG. 18.

10-1 represents the system memory 10 in an X-Y coordinate space. A source memory width MWS means the width of the X-Y coordinate space 10-1 of the system memory that is a source of the transfer. ORGS represents the origin of the X-Y coordinate space 10-1, and its value is a bit address on the system memory 10. At the source rectangular field 10-2, Xss and Yss represent X coordinate and Y coordinate, respectively, of the transfer start position; and Xse and Yse represent X coordinate and Y coordinate, respectively, of the transfer end position.

4-1 represents the frame memory 4 in the form of an X-Y coordinate space. A destination memory width MWD means the width of the X-Y coordinate space 4-1 of the frame memory that is a destination of the transfer. ORGD represents the origin of the X-Y coordinate space 4-1, and its value is a bit address on the frame memory 4. At the destination rectangular field 4-2, Xds and Yds represent X coordinate and Y coordinate, respectively, of the transfer start position.

Figure 18:
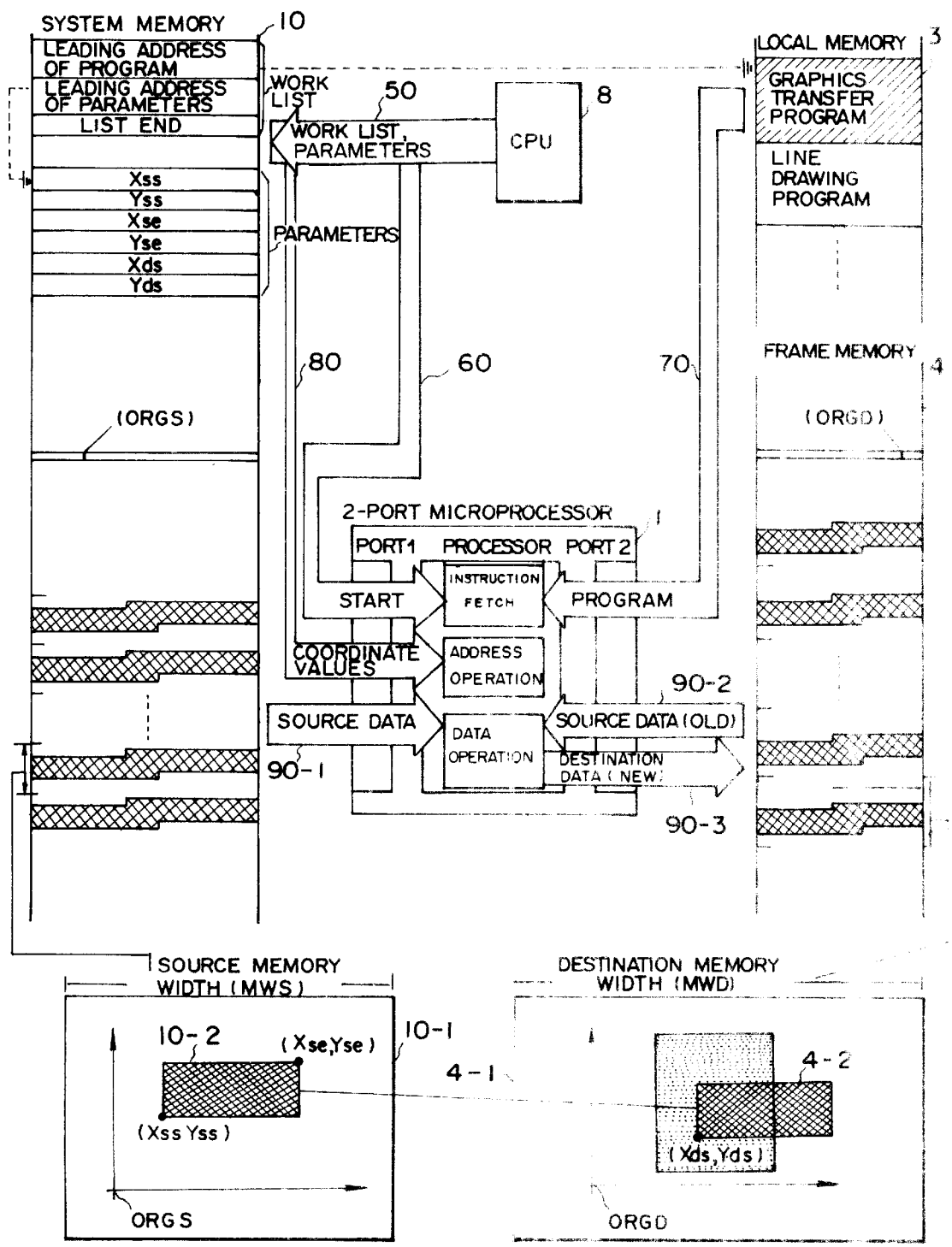
FIG. 18 is a diagram showing the manner in which graphics data are transferred from a system memory to a frame memory.

Firstly, as indicated by 50 in FIG. 18, the CPU 8 generates in the system memory 10 a work list composed of a leading address of a graphics transfer program and a leading address of graphics parameters. The CPU 8 also generates parameters needed to graphics transfer at successive addresses following to the parameters' leading address in the work list.

Then, having been activated (60) by the CPU 8, the two-port microprocessor 1 reads from the work list the leading address of a program to be executed and thereby fetches (70) from the local memory 3 a graphics transfer program. The source address of rectangular field is calculated from the coordinate values read from the system memory 10, ORGS and the source memory width (80). Likewise, the destination address of rectangular field is calculated from the coordinate values read from the frame memory 4, ORGD and the destination transfer memory width (80).

In order to perform a data transfer, with a logical operation, between data of a source rectangular field and data of a destination rectangular field, a data operation is executed, by utilizing the read/modify/write instruction discussed in connection with FIGS. 14 through 16, between the source data (90-1) read from the system memory 10 and the destination data (90-2) in the frame memory 4. The result of this logical operation is written (90-3) in the destination address. By executing the address calculation and the data operation over the rectangular fields between which the data are to be transferred, a high-speed transfer of the rectangular field data from the system memory 10 to the frame memory 4 can be achieved.

Figure 19:
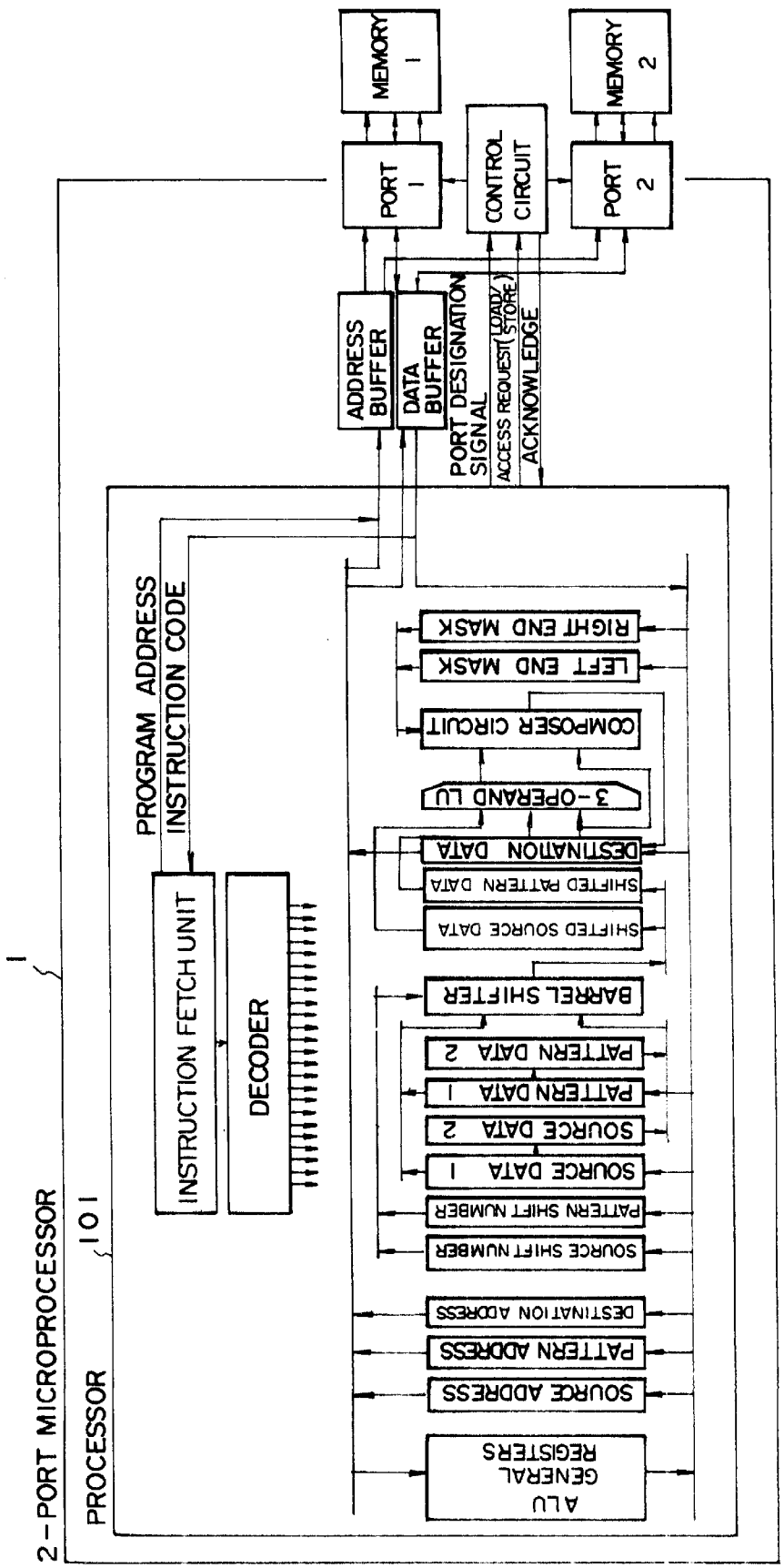
FIG. 19 is a detailed block diagram showing an operation unit in a two-port microprocessor.

The general construction of the operation unit is discussed above in connection with FIG. 6. FIG. 19 shows the detailed construction of the operation unit to be used for this data transfer of rectangular field. The operation unit comprises a register for storing the number of words (memory width) in X direction of a bit-map memory, registers (a source address register, a pattern address register, and a destination address register) for storing word addresses of three rectangular fields (a source field, a pattern field, and a destination field) defined on the bit map memory, a source shift number register for storing a difference in bit position between the source field and the destination field, a pattern shift number register for storing a difference in bit position between the pattern field and the destination field, a barrel shifter for shifting source data based on the source shift number register or shifting pattern data based on the pattern shift number register, a three-operand logic unit (three-operand LU) for performing a logical operation of the shifted source data, pattern data and destination data, a mask means for designating a writing inhibition field at opposite ends of the destination field, and a composer circuit for composing the operational result and the destination data based on the mask means.

According to this invention, partly since two sets of buses of the two-port microprocessor are usable for instruction fetch and data access, and partly since continuous memory accessing is possible, the memory accessing efficiency is improved. In the case of a graphics processing apparatus in particular, it is possible to transfer the graphics data between the system memory and the frame memory at high speed. Further, a read/modify/write process frequently used in graphics processing can be executed with no free or empty cycle between the read cycle and the write cycle, improving the performance of a graphics processing apparatus.

Although the preferred embodiments of this invention have been described here, it should be understood that various other modifications to and alternative arrangements of the elements of the illustrated embodiments may be suggested by those versed in the art as they reasonably and properly come within the spirit and scope of the invention. For example, the microprocessor using a modify buffer should by no means be limited to the two-port processor, but may be a conventional one-port processor. Further, although the graphics processing apparatus is illustrated here in the foregoing embodiments, this invention may be used in a dedicated purpose processor for special processes, e.g. printer control or communication control, which should be accompanied by data transfer between separate buses.

What is claimed is:

1. A graphics processing apparatus comprising:
   a CPU and a system memory, each connected to a system bus composed of address, data and control buses;
   a local memory and a frame memory, each connected to a local bus composed of address, data and control buses;
   a graphics processing processor having a first port connected to said system bus, and a second port connected to said local bus, said graphics processing processor having means for simultaneously accessing said system memory and said local or frame memory via said first and second ports, respectively by simultaneously issuing two separate addresses on respective address buses of said first and second ports.

2. A graphics processing apparatus comprising:
   a CPU and a first memory, each connected to a system bus composed of address, data and control buses;
   a second memory connected to a local bus composed of address, data and control buses; and
   a graphics processing processor having a first port connected to said system bus, a second port connected to said local bus, and a plurality of internal registers, said graphics processing processor having means for loading graphics data to one of said internal registers from one of said first and second memories via a corresponding one of said first and second ports and, in parallel with the loading, storing data to the other one of said first and second memories from another of said internal registers by simultaneously issuing two separate addresses on respective address buses of said first and second ports.

3. A graphics processing method in a graphics processing apparatus including a CPU and a system memory, each connected to a system bus composed of address, data and control buses, a local memory and a frame memory, each connected to a local bus composed of address, data and control buses; and a graphics processing processor having a first port connected to said system bus, and a second port connected to said local bus, said graphics processing processor having means for simultaneously accessing said system memory and said local or frame memory via said first and second ports, respectively, by simultaneously issuing two separate addresses on respective address buses of said first and second ports said method comprising the steps of:

storing a graphics transfer program in said system memory or said local memory, and storing various graphic data in said system memory;

writing a leading address of said graphics transfer program and a leading address of parameters of said graphic data in said system memory or said local memory by said CPU when said graphics data in said system memory are transferred to said frame memory; and causing said graphics processor, according to said graphics transfer program and said parameters, to transfer said graphic data in said system memory to said frame memory via said first and second ports.

4. A graphics processing method in a graphics processing apparatus including a CPU and a system memory, each connected to a system bus composed of address, data and control buses, a local memory and a frame memory, each connected to a local bus composed of address, data and control buses; and a graphics processing processor having a first port connected to said system bus, and a second port connected to said local bus, said graphics processing processor having means for simultaneously accessing said system memory and said local or frame memory via said first and second ports, respectively, said method comprising the steps of:

storing a graphics transfer program in said system memory or said local memory, and storing various graphic data in said system memory;

writing a leading address of said graphics transfer program and a leading address of parameters of said graphic data in said system memory or said local memory by said CPU when said graphics data in said system memory are transferred to said frame memory; and causing said graphics processor, according to said graphics transfer program and said parameters, to transfer said graphic data in said system memory to said frame memory via said first and second ports;

wherein when transferring said graphic data, said graphics processing processor further includes means for reading data in a destination field of said frame memory corresponding to said graphic data in a source field of said system memory, performing a logical operation over both said data and said graphic data, and writing a result of said logical operation in said destination field of said frame memory.

5. A graphics processing method in a graphics processing apparatus including a CPU and a system memory, each connected to a system bus composed of address, data and control buses; a local memory and a frame memory, each connected to a local bus composed of address, data and control buses; and a graphics processing processor having a first port connected to said system bus, and a second port connected to said local bus, said graphics processing processor having means for simultaneously accessing said system and local memories via said first and second ports, respectively, by simultaneously issuing two separate addresses on respective address buses of said first and second ports said method comprising the steps of:

storing various graphics drawing programs in said system memory or said local memory;

when drawing graphics, preparing a work list, composed of a leading address of said graphics drawing programs and a leading address of parameters of graphic data, in said system memory or said local memory by said CPU; and causing said graphics processing processor to read said work list in response to an instruction of said CPU and to draw graphics in said frame memory according to said graphics drawing programs and parameters designated by said work list.

6. A microprocessor, comprising:

a processor unit for decoding and executing an instruction;

first and second ports, each port for transferring address, data and control signals between said port and a respective memory of first and second memories;

an address buffer writable from said processor unit and readable from said ports;

a data buffer readable and writable from said ports, wherein an instruction may be read by said processor unit from said data buffer; and means for controlling an address transfer from said address buffer to one of said memories and a data transfer between said data buffer and one of said memories via a designated port according to a memory access request and a port designating signal from said processor unit;

whereby an instruction fetch and a data access can be performed with respect to said first and second memories by simultaneously issuing two separate addresses on respective address buses of said first and second ports.

7. A microprocessor according to claim 6, wherein said data buffer is readable or writable from said processor unit.

8. A microprocessor, comprising:

a processor unit for decoding and executing an instruction;

first and second ports, each port for transferring address, data and control signals between said port and a respective memory of first and second memories;

an address buffer writable from said processor unit and readable from said ports;

a data buffer readable and writable from said ports, wherein an instruction may be read by said processor unit from said data buffer; and means for controlling an address transfer from said address buffer to one of said memories and a data transfer between said data buffer and one of said memories via a designated port according to a memory access request and a port designating signal from said processor unit;

whereby an instruction fetch and a data access can be performed with respect to said first and second memories;

wherein said processor unit includes:

a register for storing a number of words in an X direction of a bit-map memory, registers including source address register, a pattern address register and a destination address register for storing word addresses of three rectangular fields including a source field, a pattern field and a destination field, respectively, defined on said bit-map memory, a source shift number register for storing a difference in bit position between said source field and said destination field, a pattern shift number register for storing a difference in bit position between said pattern field and said destination field, means for shifting source data based on said source shift number register or shifting pattern data based on said pattern shift number register, means for performing logical operations on shifted source data, shifted pattern data and destination data, mask means for designating a writing inhibition field at opposite ends of said destination field, and means for composing an operational result and said destination data based on said task means, whereby rectangular field transfer of three operands can be performed between said ports.

9. A microprocessor, comprising:

a processor unit for decoding and executing an instruction;

first and second ports, each port for transferring address, data and control signals between said port and a respective memory of first and second memories;

an address buffer writable from said processor unit and readable from said ports;

a data buffer readable and writable from said ports, wherein an instruction may be read by said processor unit from said data buffer;

means for controlling an address transfer from said address buffer to one of said memories and a data transfer between said data buffer and one of said memories via a designated port according to a memory access request and a port designating signal from said processor unit;

whereby an instruction fetch and a data access can be performed with respect to said first and second memories; and designating means for generating the port designating signal according to said memory address.

10. A microprocessor comprising:

a processor unit for decoding and executing an instruction;

first and second ports, each port for transferring address, data and control signals between said ports and a respective memory of first and second memories;

first and second sets, each set including an address buffer and a data buffer, and each set dedicated to a respective one of said ports;

means for managing operation of each of said ports; and means for writing, to a register in said processor unit, data read from said memories;

whereby accesses by said processor unit can be performed simultaneously to said memories via said ports by simultaneously issuing two separate addresses on respective address buses of said first and second ports.

11. A microprocessor for executing instructions each having a fixed length, comprising:

first instruction holding means for holding a primary instruction read from a program;

second instruction holding means for holding a sub-instruction accompanying said primary instruction; and decoding means for decoding said primary instruction and said sub-instruction, whereby when said primary instruction is an instruction using said sub-instruction as a result of decoding of said primary instruction, said sub-instruction held by said sub-instruction holding means is decoded and executed.

12. A microprocessor for executing instructions each having a fixed length, comprising:

first instruction holding means for holding a primary instruction read from a program;

second instruction holding means for holding a sub-instruction accompanying said primary instruction; and decoding means for decoding said primary instruction and said sub-instruction, whereby when said primary instruction is an instruction using said sub-instruction as a result of decoding of said primary instruction, said sub-instruction held by said sub-instruction holding means is decoded and executed;

wherein a read/modify/write instruction is defined by said primary instruction and said sub-instruction, said primary instruction designating a register for holding said sub-instruction and another register for holding a memory address, and said sub-instruction designating a register for storing data read from a memory and a type of operation to be performed on said data, so that said sub-instruction is executed as said data is read from said memory according to execution of said primary instruction to write to said memory a result of execution of said sub-instruction, thereby performing read/modify/write operation within two memory cycles.

* * * * *